US008190931B2

(12) United States Patent
Laurenti et al.

(10) Patent No.: US 8,190,931 B2
(45) Date of Patent: May 29, 2012

(54) POWER MANAGEMENT EVENTS PROFILING

(75) Inventors: Gilbert Laurenti, Saint Paul (FR); Dario Cardini, St Laurent du Var (FR)

(73) Assignee: Texas Instruments Incorporated, Dallas, TX (US)

( * ) Notice: Subject to any disclaimer, the term of this patent is extended or adjusted under 35 U.S.C. 154(b) by 463 days.

(21) Appl. No.: 12/478,273

(22) Filed: Jun. 4, 2009

(65) Prior Publication Data
US 2010/0281309 A1    Nov. 4, 2010

(30) Foreign Application Priority Data

Apr. 30, 2009 (EP) ..................................... 09290316

(51) Int. Cl.
*G06F 15/00* (2006.01)
(52) U.S. Cl. ........ 713/300; 713/310; 713/320; 713/321; 713/322; 713/323; 713/324; 713/330; 713/340
(58) Field of Classification Search .................. 713/300, 713/310, 320–324, 330, 340
See application file for complete search history.

(56) References Cited

U.S. PATENT DOCUMENTS

| 6,989,684 | B2 * | 1/2006 | Butler ....................... 324/750.03 |
| 7,418,368 | B2 * | 8/2008 | Kim et al. ..................... 702/185 |
| 2006/0265610 | A1 * | 11/2006 | Kim ............................. 713/300 |
| 2007/0260952 | A1 * | 11/2007 | Devanathan et al. ......... 714/726 |
| 2008/0229130 | A1 * | 9/2008 | Guan et al. .................... 713/323 |

OTHER PUBLICATIONS

MIPI Alliance, Inc. "MIPI Allance Test and Debug—NIDnT-Port", White paper, Approved Version: 1.0, Jan. 10, 2007, pp. 1-13.
MIPI Alliance, Inc. "MIPI Allance Test and Debug Interface Framework", White paper, Approved Version: 3.2, Apr. 7, 2006, pp. 1-11.

* cited by examiner

*Primary Examiner* — M Elamin
(74) *Attorney, Agent, or Firm* — Michael A. Davis, Jr.; W. James Brady; Frederick J. Telecky, Jr.

(57) ABSTRACT

In a method for monitoring power consumption by a system within an integrated circuit, one or more software programs are executed on the system on a chip (SOC). While the program executes, power control settings of a plurality of functional units within the SOC may be adjusted in response to executing the one or more software programs, whereby power consumption within the SOC varies over time. The power control settings may be changed in response to explicit directions from the executing software, or may occur autonomously in response to load monitoring control modules within the SOC. A sequence of power states is reported for the plurality of functional units within the SOC. Each of the sequence of power states may include clock frequencies from multiple clock domains, voltage levels for multiple voltage domains, initiator activity, target activity, memory module power enablement, or power enablement of each of the plurality of functional units.

20 Claims, 15 Drawing Sheets

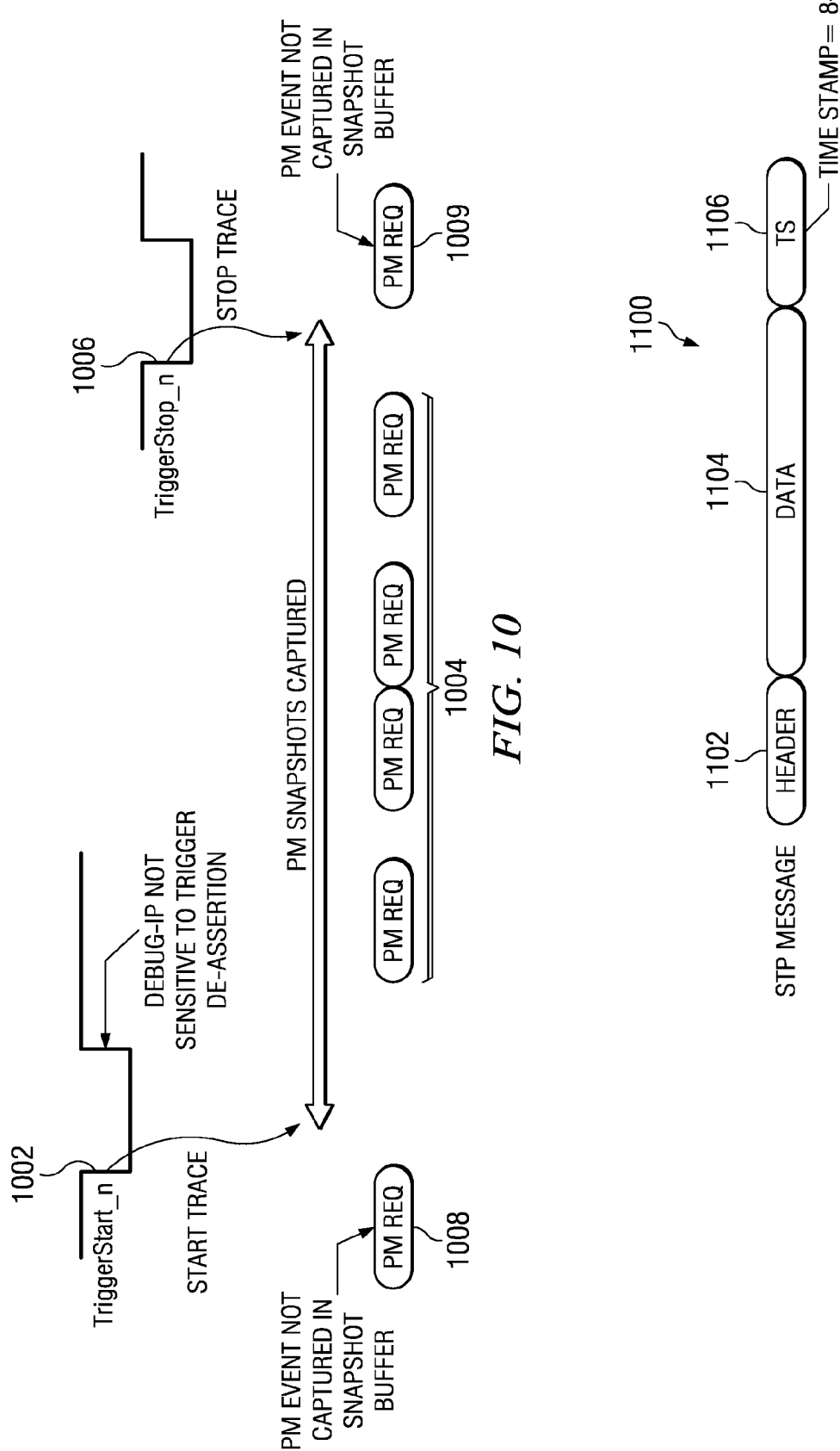

US 8,190,931 B2

POWER MANAGEMENT EVENTS PROFILING

CLAIM OF PRIORITY

This application for Patent claims priority to European Patent Application No. EP 09 290 316.0 entitled "Power Management Events Profiling" filed 30 Apr. 2009, and is incorporated by reference herein.

FIELD OF THE INVENTION

This invention generally relates to application software development, software integration, and system optimization of complex integrated circuits and in particular to tracing hardware power events, including voltage and clock frequency adjustments.

BACKGROUND OF THE INVENTION

Testing and debugging of a new application specific integrated circuit (ASIC) or of a new or modified application program running on an ASIC requires insight into the internal workings of busses and program execution. The IEEE 1149.1 (JTAG) standard has proven to be a very robust solution to a variety of test and debug systems, enabling a rich ecosystem of compliant products to evolve across virtually the entire electronics industry. Yet increasing chip integration and rising focus on power management has created new challenges that were not considered when the standard was originally developed. The Mobile Industry Processor Interface (MIPI) Test and Debug Working group has selected a new test and debug interface, called P1149.7, which builds upon the IEEE1149.1 standard. P1149.7 enables critical advancements in test and debug functionality while maintaining compatibility with IEEE 1149.1. In addition to P1149.7, the MIPI test and debug interface specifies how multiple on-chip test access port (TAP) controllers can be chained in a true IEEE1149.1 compliant way. It also specifies a System Trace Module (STM). STM consists of a System Trace Protocol (STP) and the Parallel Trace Interface (PTI). The signals and pins required for these interfaces are given through the 'MIPI Alliance Recommendation for Test & Debug—Debug Connector', also part of the MIPI test and debug interface. The main blocks of the MIPI Debug and Trace Interface (DTI), seen from outside of the system, include: a debug connector; the basic debug access mechanism: JTAG and/or P1149.7; a mechanism to select different TAP controllers in a system (Multiple TAP control); and a System Trace Module.

The System Trace Module helps in software debugging by collecting software debug and trace data from internal ASIC buses, encapsulating the data, and sending it out to an external trace device using a minimum number of pins. STM supports the following features:

Highly optimized for SW generated traces
Automatic time stamping of messages
Allows simultaneous tracing of 255 threads without interrupt disabling
Configurable export width 1/2/4 pin+dedicated clock+optional return channel
  Minimal pin usage 2 pin (1 data+1 clock)
  Maximum pin usage 6 pins (4 data+1 clock+1 return channel)
Maximum planned operating frequencies 166 MHz (double data rate clocking)
Provides a maximum bandwidth of slightly above 1 Gbit/s (theoretical max. 1.6 Gbit/s)
Supports up to 255 HW trace sources
Support for 8,16,32 and 64 bit data types A maximum of 255 different bus initiators can be connected to the STM trace port via a bus arbiter. The bus initiators can be configured for either SW or HW type to optimize the system for different types of trace data. SW type initiator messages are used to transmit trace data from operating system (OS) processes/tasks on 256 different channels. The different channels can be used to logically group different types of data so that it is easy to filter out the data irrelevant to the ongoing debugging task. The message structures in STM are highly optimized to provide an efficient transport especially for SW type initiator data.

BRIEF DESCRIPTION OF THE DRAWINGS

Particular embodiments in accordance with the invention will now be described, by way of example only, and with reference to the accompanying drawings:

FIG. 10 is a timing diagram illustrating triggering of event collection;

FIG. 11 illustrates the general format of the STP message format;

DETAILED DESCRIPTION OF EMBODIMENTS OF THE INVENTION

Figure 1:
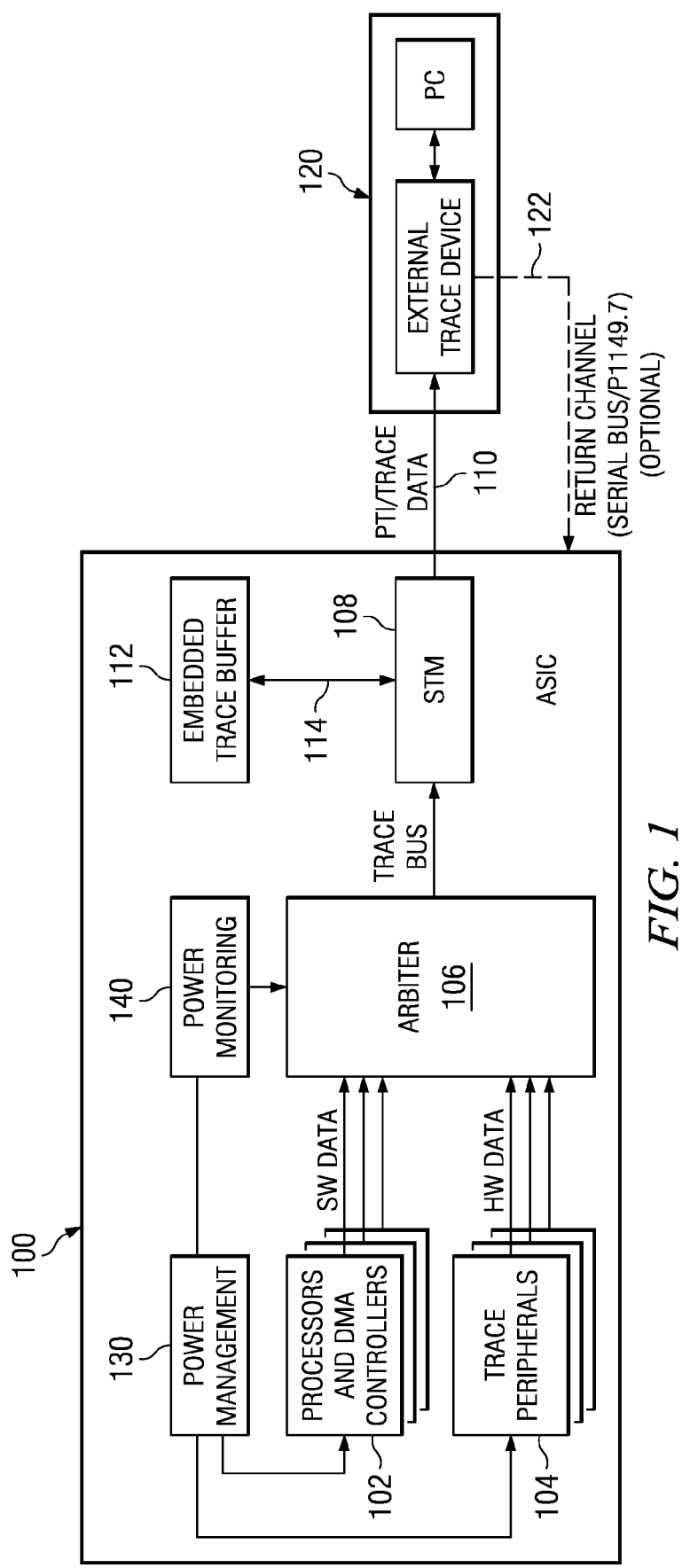
FIG. 1 is a block diagram illustrating a exemplary application specific integrated circuit (ASIC) with power control and power monitoring circuitry coupled to a system trace module (STM)

In order to test and debug a new application specific integrated circuit (ASIC) or a new or modified application program running on an ASIC, various events that occur during execution of an application or a test program are traced and made available to external test equipment for analysis. A time stamp is formed to associate with each trace event of a sequence of trace events. Embodiments of the present invention provide a scheme taking advantage of the system trace infrastructure to provide to the user visibility on the major power management (PM) events. The PM state changes are handled as generic events and encapsulated in system trace protocol (STP) messages and exported through the system trace module (STM) module. The nature of the power management events doesn't require accurate time stamping, therefore time stamp is handled at the STM or at the trace receiver level.

Embodiments of the present invention provide visibility into increasingly complex SOCs (system on a chip). A variety of power management techniques may be applied, such as dynamic voltage and/or frequency scaling, dynamic power switching, static leakage management, clock gating, etc. Various portions of a complex SOC may utilize real-time and concurrent PM sequences. Software being executed on the various functional units of the SOC may configure one or more of the PM sequences. As SOCs become more complex, they are being partitioned into ever larger numbers of voltage, power and clock domains in order to better manage and reduce power consumption. For sake of clarity, voltage, power and clock domains are defined here. A voltage domain is a subset of the device with dedicated power rails supplied by the same voltage regulator (either external or internal to the device). Normally, at least two voltage domains always exist on a device: the IO voltage domain and the core logic voltage domain. The voltage domain partitioning is much finer in todays SOCs for mobile applications, core logic being often divided into several voltage domains and different memories or IO groups having dedicated voltage domains. The voltage domain partitioning allows having different regions of a chip supplied with different voltage levels. A power domain is a subset of the device independently supplied through internal power switches. The power domain partitioning allows to have different regions of a chip in different power states, either operational (on) or standby (retention, off). A retention state (RET) is a minimal voltage that will retain memory contents of a memory circuit in the domain. In the last years there has been a trend of increasing number of power domains in the SOCs for mobile applications (from single power domain to some tenths). This trend is expected to continue. A clock domain is a subset of a chip receiving the same clock signal. Currently, complex SOCS have more than a hundred clock domains. An SOC may have more than one clock source, each of which may then supply multiple clock domains. Typically, a clock source is a phase locked loop (PLL) that is also configurable to allow changes in operating frequency. A digital PPL (DPLL) is embodied using digital techniques and is easily controlled by software or an autonomous controller.

The PM events are organized by class. Any PM state change from a specific class will refresh the entire instrumentation frame associated with that class. The STP message structure will include a PM Event-ID indicating the PM event class. Software events from the Power Management routines instrumentation can be interleaved with the PM hardware events. The user can take advantage of that feature to understand latencies for a specific Power Management scenario or strategy.

Clock management (CM) event profiling is similar to the PM instrumentation. Two instrumentation modes are supported: clock activity and module activity. Clock activity exposes to the user a snapshot of the state of all the clock domains when CM detects a clock domain state change. It also exposes to the user a snapshot of the clock source settings when the CM signals a clock source programming event.

Module activity exposes to the user periodically active cycle counts of one or more target modules. Similarly, active cycle counts of initiator modules may be reported. CM event profiling provides to the user visibility on the major clock domains state along the application code execution. The STP message reports the effective state of various clock domains and therefore can highlight scenarios where a particular dependency is preventing the clock domain from being switched off, for example.

For purposes of this disclosure, a power state may include settings for voltage domain and power domain controls as well as settings for clock domain controls. A power state may also include activity measures for various functional modules within the SOC. A complex power state may include some or all of the variables mentioned above. However, each change event to each individual voltage, power or clock domain or activity is also referred to as a new power state. As will be described in more detail below, the power state updates are captured within a configurable sampling window. Each captured state is exported along with a time stamp and status information at the end of the window. This allows a developer to analyze complex applications interaction scenarios and to identify changes in an application that may reduce power consumption by the SOC. For example, the efficiency of the various autonomous controllers that are implemented in silicon on the SOC may be evaluated and optimized to reduce power consumption in various scenarios. Directions for improvement and ways to simplify the power management schemes may be identified. Closing the loop on the detailed operation of power management schemes allows reduction in power consumption in localized areas that benefit operation of the entire system on a chip. Monitoring the PLL or DPLL adjustment events also provides valuable insight into the operation of the SOC.

FIG. 1 is a block diagram illustrating a exemplary application specific integrated circuit (ASIC) 100 with a system trace module (STM) 108 and an embedded trace buffer (ETB) 112. For purposes of this disclosure, the somewhat generic term "ASIC" is used to apply to any complex system on a chip (SOC) that may include one or more processors and DMA (direct memory access) controllers 102 and may also include one or more peripherals 104 any of which may generate trace events that are useful for debugging the ASIC or an application running on the ASIC. These various processing units, DMA units and peripherals will be referred to herein as functional units. Event tracing of software execution in general is well known and will not be described in further detail herein.

Power management circuitry 130 is coupled to the various functional units. The power control circuitry is adjustable to individually control power consumption of each the various functional units. This can be done by changing the voltage applied to a functional unit, switching off the associated power domain, changing the clock frequency provided to a functional unit, or by changing a combination of voltage and clock frequency, for example. Changes can be made in response to a particular control instruction executed by one of the functional units that changes an appropriate control bit in a register, for example. Changes can also be done autonomously under control of a specialized hardware controller that determines present loading of the functional unit and changes its clock frequency or voltage level to match the performance and thereby power consumption to the processing load of the functional unit. For example, if a DMA unit has buffered data ready to transfer it can be placed in a high performance, and thereby high power consumption, state. If it has no pending data to transfer, it can be autonomously placed in a low power consumption state. Similarly, a memory domain may be placed into a standby state in which only a retention voltage is supplied to the memory domain. The retention (RET) voltage is selected to be no larger than is needed to preserver the storage states of the memory.

Power monitoring instrumentation (PMI) circuitry 140 is coupled to power management circuitry 140. In this manner, the design of the functional units within the SOC is not affected and integration of the SOC is simplified. The power monitoring circuitry is configured to report a sequence of power states for the various functional units, wherein each adjustment of the power control settings is a new power state.

As will be discussed in more detail later, a power state may include clock frequency, voltage level, initiator activity, target activity, memory module power enablement, or power enablement of each of the plurality of functional units, for example. Power monitoring circuit 140 is coupled as a trace peripheral to STM 108 via arbiter 106 so that the sequence of power states can be reported to an external trace device 120 and thereby correlated to instruction traces. This exposes the internal operation of the power control circuitry and allows identification of a particular portion of the one or more software programs executing on the SOC that result in higher power dissipation in the SOC by examining the correlated sequence of power states and instruction traces. The identified portion of the one or more software programs may then be revised to reduce power consumption on the SOC.

In this embodiment, an arbiter 106 collects the various trace events, prioritizes them, and provides them to the system trace module for further processing. In this embodiment, STM 108 can operate in two different modes. When an external trace device is connected to ASIC 100 via interconnect 110, the STM may transmit sequences of trace events and time stamps directly to external trace receiver 120 as they are received. Interconnect 110 may include signal traces on a circuit board or other substrate that carries ASIC 100 which connect to a parallel trace interface (PTI) provided by ASIC 100, as discussed earlier. Interconnect 110 may include a connector to which a cable or other means of connecting to external trace receiver 120 is coupled. An optional return channel 122 such as serial bus/P1149.7 may be used to provide control information from external trace device 120 to ASIC 100.

In FIG. 1, a single PMI 140 is illustrated. However, in other embodiments more than one instance of PMI module 140 may be provided, each one connected to arbiter 106. In this manner, the PMI design is modular and easy to adapt to various types of SOC.

In a second mode of operation, an external trace device may not be connected to ASIC 100 during a trace capture episode, or there may not be a provision for connecting an external trace device. In this mode, STM 108 transmits the sequences of trace data and associated time stamps to an embedded trace buffer (ETB) within ASIC 100 via an internal bus or other interconnect 114. In this case, after a debug session, the contents of ETB 112 may be transferred to another device by using another interface included within ASIC 100, such as via a USB (universal serial bus) or a JTAG port, for example. Alternatively, after a debug session an external trace receiver 120 may then be connected to ASIC 100 and the contents of ETB 112 may be accessed by STM 108 and then transmitted to external trace device 120 via interconnect 110.

Figure 2:
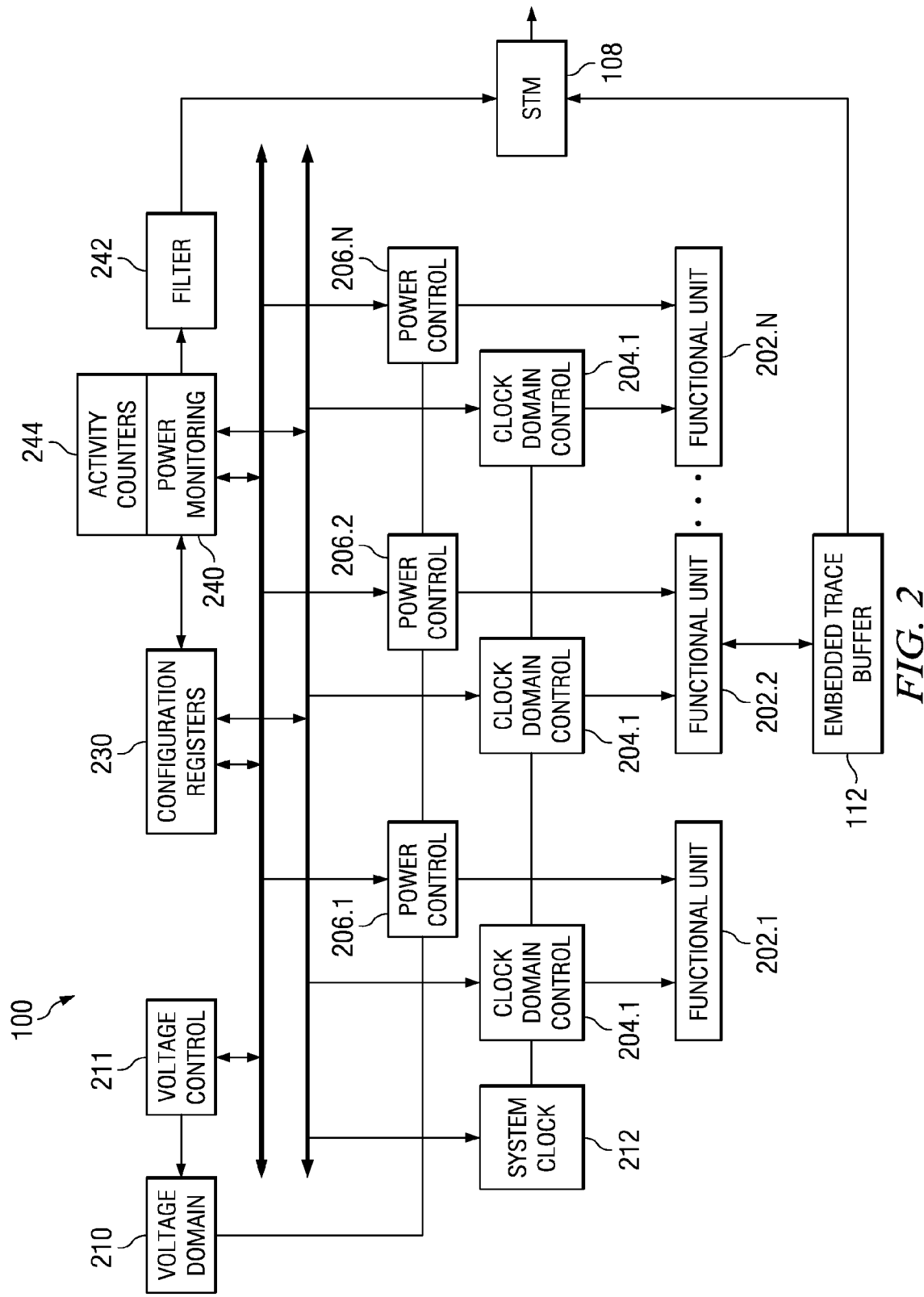
FIG. 2 is a more detailed block diagram of a portion of the ASIC of FIG. 1 illustrating the power control and power monitoring circuitry.

FIG. 2 is a more detailed block diagram of a portion of the ASIC of FIG. 1 illustrating power control circuitry 206 and power monitoring circuitry 204. Functional units 202.1-202.N are representative of the various processors, controllers, peripherals and memory within SOC 100. Each functional unit typically receives power from a voltage domain source represented as voltage domain 210. It is to be understood that voltage domain 210 may represent a single voltage provided via one or more contacts on the SOC, or it may represent two or more different voltage levels provided via multiple contacts on the SOC. Voltage control module 211 is configured to control the voltage level supplied to the voltage domain. This may be done by selecting between different voltage levels supplied to the SOC or by adjusting a voltage regulator, for example. Power control modules 206.1-206.N represent power domains and each provides power control to one or more individual functional units. This may be done by selecting between different voltages that are provided to SOC 100. In another embodiment, one or more of the voltage control modules may include a regulator to reduce or raise the domain voltage using generally known techniques. This may allow a particular functional device to operate in a high performance mode with higher voltage and to operate in a lower performance mode with a lower voltage. Thus, the operating point (OPP) of a selected functional unit may be dynamically varied based on processing load or other system inputs. Depending on the type of functional unit, two or more power/performance modes may be supported. Normally a voltage control module interfaces to one or more power control modules that allow setting the power state individually for each power domain belonging to the same voltage domain. This way, those power domains are supplied by the same voltage value (that can be lowered or increased depending on performance requirements) but each of them can have an independent power state (on/off/retention). In other cases, the same power domain is split between multiple voltage domains, thus allowing exploiting the full flexibility of the voltage/power domain partitioning. Depending on the characteristics of the functional modules within the power domain, the voltage controller may be configurable under software or autonomous hardware control to reduce the voltage to one or more different voltage values to reduce power consumption. While one voltage domain 210 is illustrated in FIG. 2, it is to be understood that a typical SOC may have several voltage domains.

Similarly, each functional unit typically receives a clock signal that is used to operate the digital logic within the module. System clock module 212 is a phase locked loop in the embodiment of FIG. 1. As such, the frequency of system clock module 212 may be easily changed under control of software. Furthermore, the system clock frequency may be divided to produce lower clock frequencies for various functional units. Clock control modules 204.1-204.N represent and control clock domains. Within each clock domain, the clock control module may include a divider to reduce the clock frequency for that domain. Depending on the characteristics of the functional modules within the clock domain, the clock controller may be configurable under software or autonomous hardware control to reduce the clock frequency to two or more different frequency values to reduce power consumption. Alternatively, clock gating may be embodied such that a selected percentage of clock pulses are masked. Depending on the type of functional unit, the clock signal in a particular domain may be stopped completely to put the functional unit into an off or sleep mode. For example, if a particular memory module is not being accessed at a high rate, the clock rate to the memory module may be reduced to conserve power. Similarly, if a DMA controller is not scheduled to transfer data, the clock frequency to the DMA controller may be reduced or halted altogether to reduce power consumption. Wakeup events indicate when a domain is taken out of low power sleep mode.

Power configuration circuitry 230 is coupled to the various voltage control modules and clock control modules. Power configuration circuitry 230 includes configuration registers that are accessible by one or more of the functional modules to allow software based configuration settings. The control registers in turn control the operations described above in voltage and clock control modules. As used herein, the term "power management circuitry" generally refers to configuration registers 230, clock control modules 204.n and power control modules 206.n.

Activity counters 244 are configured to monitor the operation of several of the functional units 202.n and keep track of the number of execution cycles performed by each functional unit. Operation of these counters will be described in more detail later.

Power monitoring circuitry 240 is coupled to the configuration and control modules of the power management circuitry to allow reporting changes in settings that affect power consumption as a software application program is executed on the SOC. As discussed above, changes in the power control circuitry may occur as a result of an explicit software directive, or may result autonomously as a result of changing loads in response to executing the application software. Collectively, the configuration of all of the power and clock control modules is referred to herein as a power state. Each time a setting of any of the control modules is changed a new power state is created. An event is also created to indicate that a change in voltage and/or clock setting has occurred. Power monitoring circuitry 240 is coupled to STM 108 to allow reporting a sequence of power states for the various functional units for examination and analysis by an external monitoring system that is performing a test or evaluation of the SOC. The configuration registers are also accessible via monitoring circuitry 240 to allow access by the external system. In some embodiments, a filter 242 may be provided to allow filtering of which events are reported to the external monitoring system.

As mentioned earlier, the PM events are organized by class. Any PM state change from a specific class will refresh the entire instrumentation frame associated with that class. The STP message structure will include a PM Event-ID indicating the PM event class. Software events from the Power Management routines instrumentation can be interleaved with the PM hardware events. The user can take advantage of that feature to understand latencies for a specific Power Management scenario or strategy. Table 1 shows a summary of the PM events reported through the STP instrumentation framework by the exemplary embodiment of FIG. 1. It should be understood that in other embodiments other types of events may defined. Similarly, field sizes and message formats may be embodied differently in other embodiments.

TABLE 1

PM events

| | | | STP Message | |
|---|---|---|---|---|
| PM event class | Parameters | States | Field size | Fields number |
| Logic Voltage Domain OPP change | Voltage value sent out during the last I2C frame transaction | n/a | 8 | Generic |
| Memory Voltage Domain OPP change | State of the Memory Voltage FSM. | ON SLEEP OFF | 4 | Generic |
| Logic Power Domain state change | Power domain state | ON OFF RET | 2 | Generic |
| Memory Power Domain state change | Power domain state | ON OFF RET | 2 | Generic |

For example, for the memory voltage domain, Table 1 suggests a field size of four bits. If the states are as follows, where LDO means Low Dropout, then only a one bit message is needed:

1=LDO is in ON mode and operating at normal voltage.
0=LDO is in SLEEP mode and operating at trimmed voltage.

As mentioned earlier, CM event profiling is similar to the PM instrumentation. Two instrumentation modes are supported in the embodiment of FIG. 1: clock activity and module activity. Clock activity exposes to the user a snapshot of the state all the clock domains when CM detects a clock domain state change. Table 2 shows a summary of the CM events reported through the STP instrumentation framework. It should be understood that in other embodiments other types of CM events may defined. Similarly, field sizes and message formats may be embodied differently in other embodiments.

TABLE 2

CM events

| | | | STP Message | |
|---|---|---|---|---|
| CM event class | Parameters | States | Field size | Fields number |
| Operating mode = Events capture | | | | |
| Clock domain State | Clock domain state | ON OFF OFF | 1 | Generic |
| DPLL settings update | PLL-ID | | 8 | 1 |
| | PLL STATUS | | 8 | 1 |
| | M | | 13 | 1 |
| | N | | 7 | 1 |
| | M2 | | 5 | 1 |
| | M3 | | 5 | 1 |
| | Mode | | 4 | 1 |
| | HS-DIVIDER factor | | 5 | 1 |
| Clock frequency divider ratio update | DIVIDER ID | | 8 | 1 |
| | DIVIDER ratio | | 8 | 1 |
| Clock source selection update | MUX ID | | 8 | 1 |
| | MUX selection | | 8 | 1 |
| Operating mode = Module activity collection | | | | |
| Target activity | Activity ratio | | 8 | 4 Generic |
| Initiator activity | Activity ratio | | 8 | 4 Generic |

Figure 3:
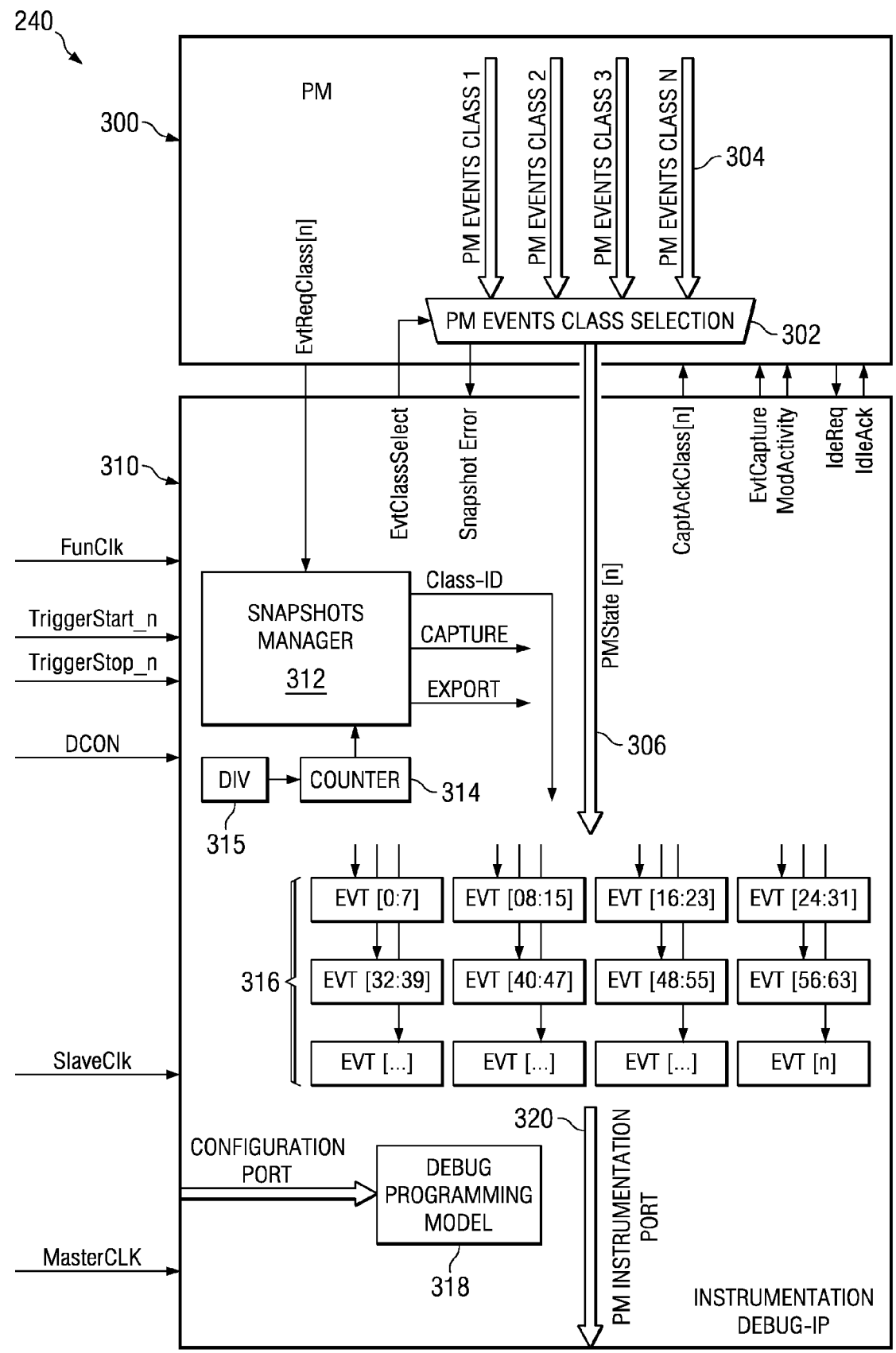
FIG. 3 is a more detailed block diagram of the power monitoring event capture module in the power monitoring circuitry of FIG. 1.

FIG. 3 is a more detailed block diagram of event capture in the power monitoring circuitry 240 of FIG. 1. It includes a power monitoring function 300 and an instrumentation portion 310. Within monitoring function 300 is a selector 302 that is configured to select a particular type of event class, indicated generally at 304. The events are generated by the various voltage and clock control modules discussed with regards to FIG. 2.

A snapshot manager 312 in instrumentation module 310 is accessible via configuration port 318 coupled to the STM and thereby to an external monitoring system to specify which class of events to collect at a particular time. A configurable counter 314 is set to specify a window size for capturing the selected type of events. A trigger may also be specified to initiate or terminate event collection, as will be described in more detail later. The selected events are transferred via bus 306 to a register file 316. When the window time expires, the collected events are sent to the STM via bus 318 where a header and time stamp are added and then exported to the external monitoring system.

The PM events are grouped by class and qualified by a PM events class ID. Any PM state change may be exposed to a user on the external monitoring system. As used herein, the term "user" generally refers to a software or hardware developer or team that is testing the SOC or evaluating power consumption of the SOC while selected application programs are executed on the SOC. However, it should be understood that a user may also be a computerized system that is programmed to analyze the instruction stream traces and power management event messages and propose or perform optimizations to the application software or to the SOC hardware configurations.

In this embodiment, each PM event generates a request to the instrumentation snapshot manager 312. The request is asserted until the snapshot capture has been acknowledged. The snapshot manager then selects the appropriate PM events group to be routed to the event registers 316. If more than one transition is detected for the same event within the sampling window, then an error is recorded.

When the sampling window expires the instrumentation module captures a snapshot of all the events from the selected events group. It captures the error flag signaling multi-transitions of the same event within the sampling window. It tracks snapshot export across sampling window boundaries in order to signal a time stamp inaccuracy. Then, for each event class it acknowledges to the PM module that a snapshot has been captured or discarded. In this embodiment, the events buffer is shared by all the PM events classes and is designed to store a single snapshot. It is therefore sized according to the class of events that requires exporting the largest amount of instrumentation data.

Sampling Window

The programming model in this embodiment allows sizing the sampling window. All the PM events from the same class detected within the user defined sampling window are reported by the same snapshot and get the same time stamp. When the sampling window is properly sized it is expected that for a typical PM scenario, for each PM event there is a single transition within the sampling window. It is the responsibility of the PM module to track multi-transitions and signal the error. The entire snapshot will be qualified by a status error indicating for which event multi-transitions are detected. Concurrent PM Events may be either: collapsed in the same snapshot when associated with the same PM events class; sequentially exported when associated to a different class; or discarded when the export throughput doesn't allow capturing a new snapshot.

Figure 4:
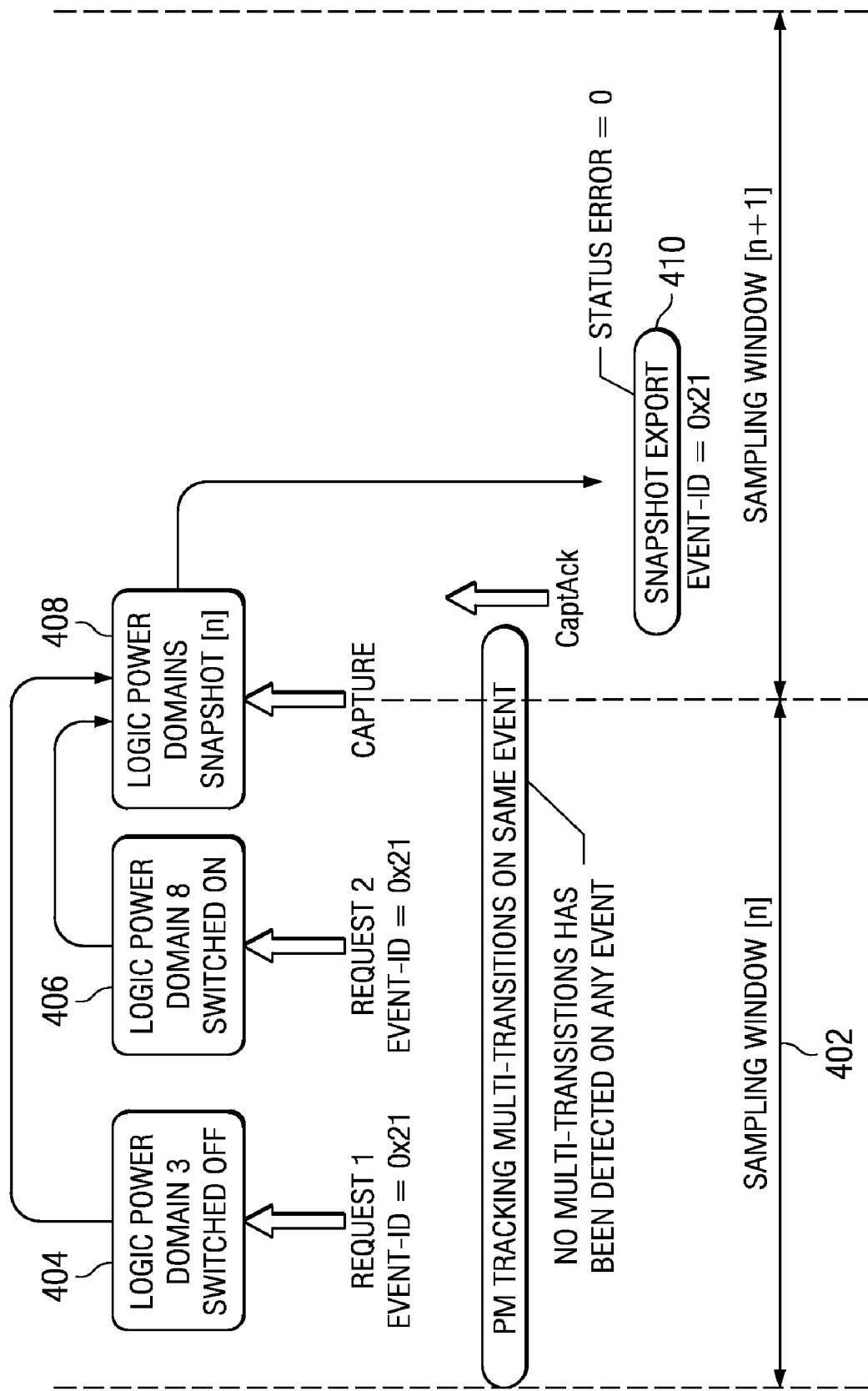
FIGS. 4-9 are timing diagrams illustrating operation of various event capture sequences.

FIGS. 4-9 are timing diagrams illustrating operation of various event capture scenarios. FIG. 4 illustrates PM events from same class detected within the same sampling window 402. In this example, power domain 3 is switched off and generates request 404 with an event ID=0x21. Later, power domain 8 is turned on and generates request 406 with the same event ID=0x21. Assuming the instrumentation buffer is empty, the PM request is immediately processed when the sampling window expires at time 408. The latency introduced by the instrumentation module is minimal. The concurrent events are reported by the same snapshot export 410 and get the same time stamp.

Figure 5:
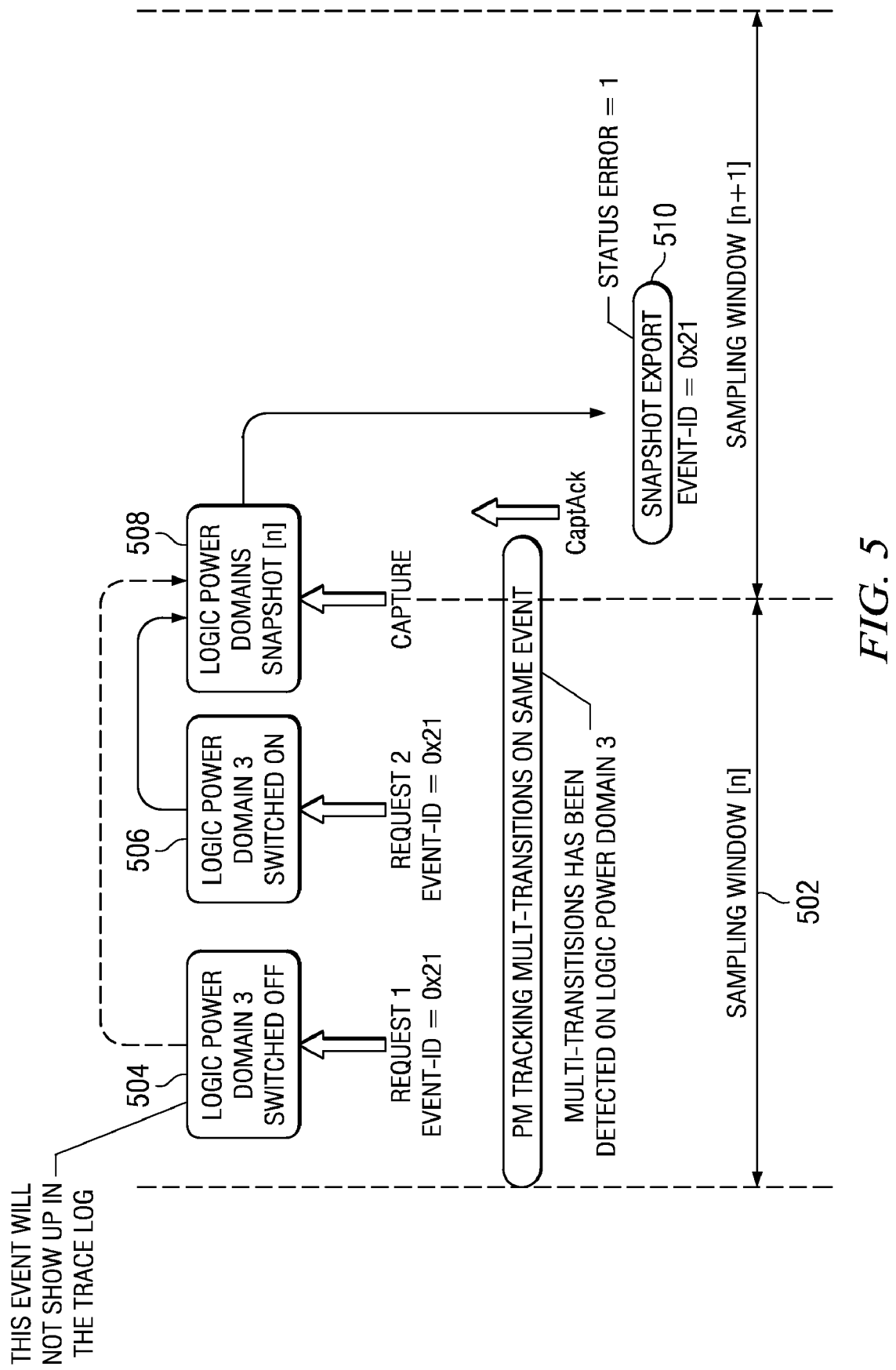

FIG. 5 illustrates a PM event with multi-transitions within sampling window 502. In this example, power domain 3 is switched off and generates request 504 with an event ID=0x21. Later, power domain 3 is switched on and generates request 506 with an event ID=0x21. However, in this case both events refer to the same power domain 3. Assuming the instrumentation buffer is empty, the PM request is processed when the sampling window expires. In this scenario the reported power state 508 is the state 506 of the PM when the sampling window expires. Therefore transition 504 will not show up in the trace log in snapshot export 510. For each event, the PM determines if there is an extra transition in between the first request and the snapshot acknowledge. If any multi-transitions are detected, the PM flags the entire event class state 508 in error. The error is captured in the snapshot status portion of snapshot export 510.

Figure 6:
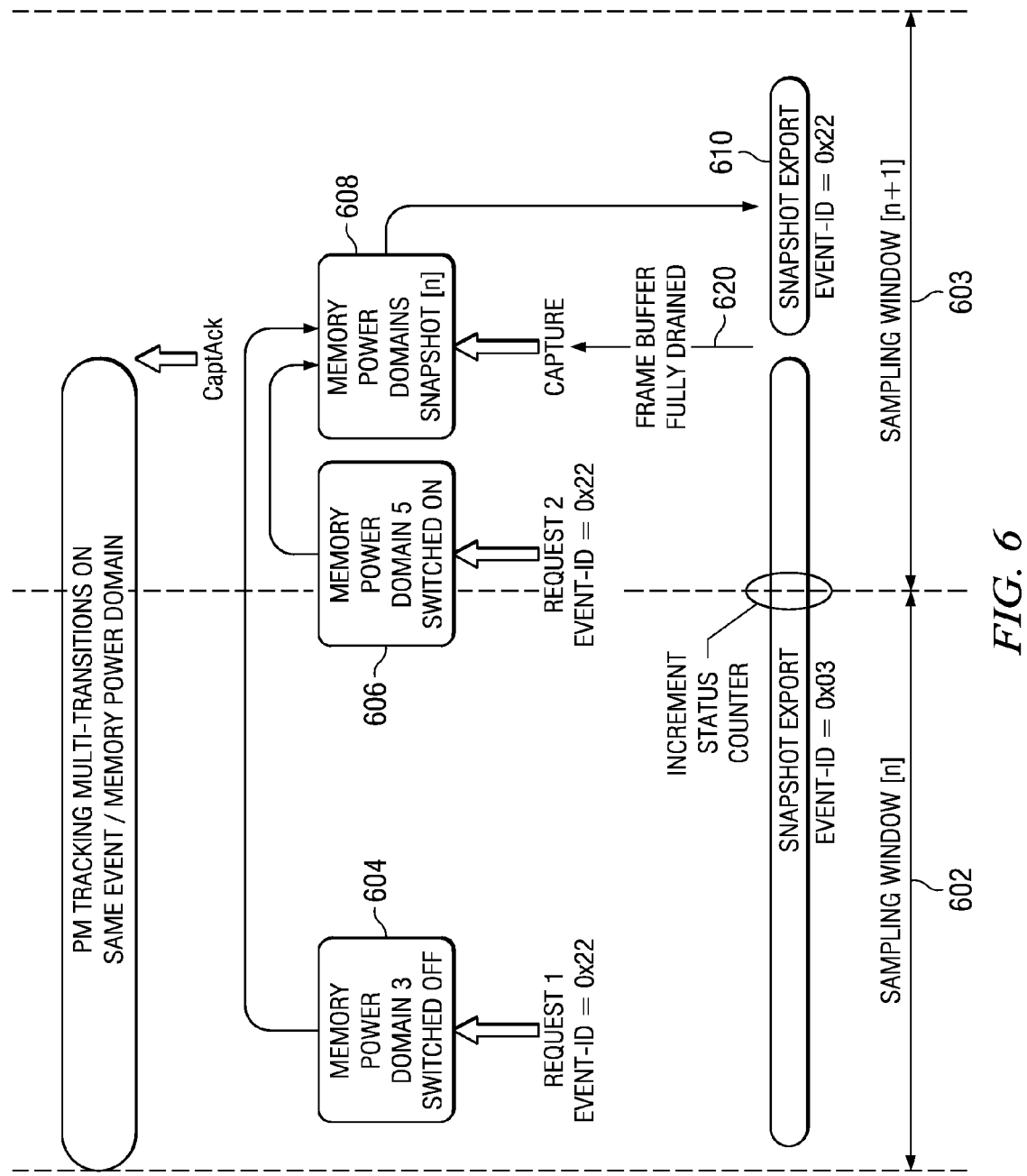

FIG. 6 illustrates a PM event detected while the instrumentation buffer is not empty during window 602. In this example, memory power domain 3 is switched off and generates request 604 with event ID=0x22. The PM request remains pending until the previous snapshot has been exported to the STM and the instrumentation buffer is empty. As soon as the buffer is empty at time 620 the buffer will be refreshed by a new snapshot 608 and exported. If meanwhile another PM event 606 from same class has been detected, it will also be reported by this snapshot, even though request 606 occurred during the next snapshot window 603. In this case, some latency is introduced by instrumentation module 310 and therefore the time stamp is not as accurate as for the previous use case. This should be considered negligible at the SOC power management scale provided that for a request detected within the sampling window [n] the corresponding snapshot export can be completed within the sampling window [n+1]. In case the above condition cannot be met, the snapshot status will be set to indicate additional latency impacting the Time Stamp accuracy.

Figure 7:
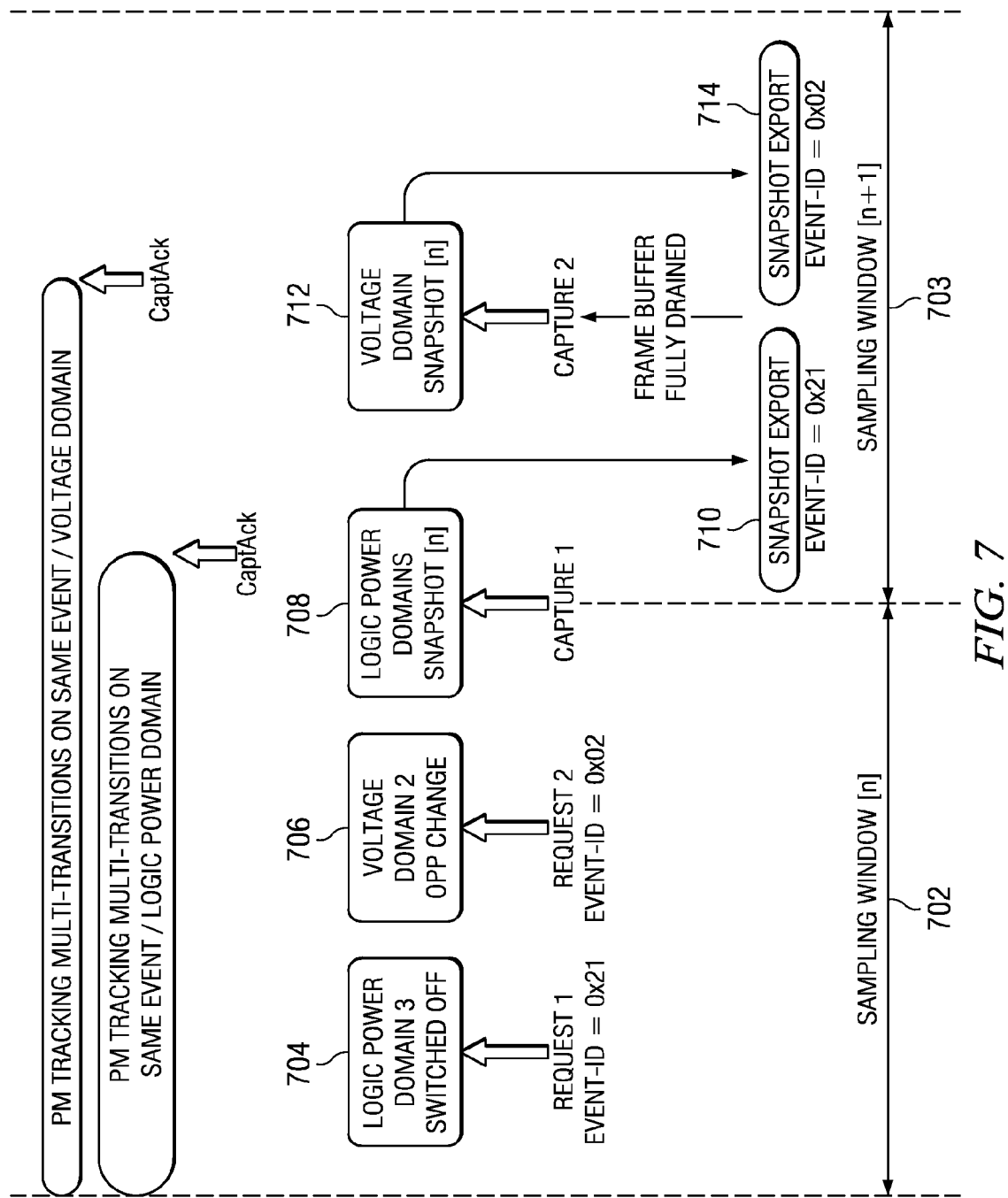

FIG. 7 illustrates PM events from different classes detected within the same sampling window 702. In this example, logic power domain 3 is switched off and generates request 704 with event ID=0x21 and voltage domain 2 records an OPP change and generates request 706 with event ID=0x02. Two events from different classes cannot be reported by the same snapshot. There is no priority requirement for the PM events capture or export. Assuming the instrumentation buffer is empty, the first event group is captured into the instrumentation buffer as snapshot 708. The other requests remain pending until the first snapshot has been exported to the STM in snapshot export 710 with event ID=0x21. As soon as the buffer is empty, the buffer will be refreshed by a second snapshot 712 and exported as snapshot export 714 with event ID=0x02. If meanwhile another PM event from same class has been detected, it may also be reported by this snapshot.

Some latency is introduced by the PM instrumentation module and therefore the time stamp is not as accurate as for the previous use case. This should be considered negligible at the SOC power management scale provided that for a request detected within the sampling window [n] the corresponding snapshot export can be completed within the sampling window [n+1]. In case the above condition cannot be met the snapshot STATUS indicates additional latency impacting the Time Stamp accuracy.

Figure 8:
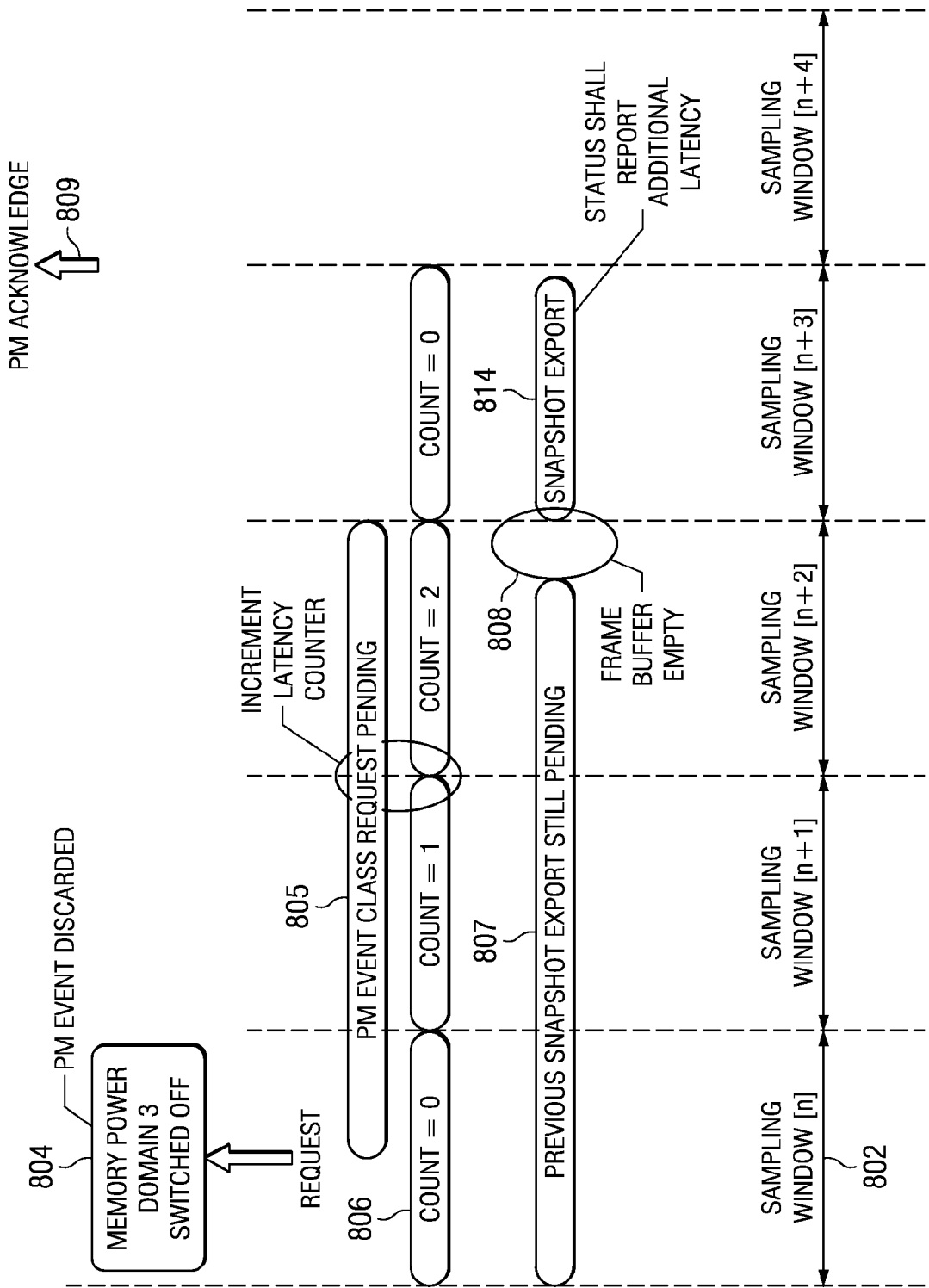

FIG. 8 illustrates PM events snapshot export delayed after sampling window 802. The PM instrumentation pipelining assumes that the snapshot corresponding to the PM events detected in sampling window [n−1] are initiated within the sampling window [n]. When this requirement cannot be met due to export throughput limitation, the PM instrumentation module allows the PM request 804 to be kept pending as indicated at 805 for a few sampling windows. In this example, a prior snapshot is still pending as indicated at 807. Each event class gets a small counter resource, indicated at 806. In this example, the prior snapshot is exported and the buffer is therefore free at time 808. For a case where the snapshot export can be initiated before the associated counter reaches its maximum value, the high level STP message status field reports the export latency in snapshot export 814 providing the trace receiver software a mean to improve time stamping accuracy. The PM request is acknowledged at 809 and each pending PM event returns its own acknowledge. The counter is then cleared to be ready for next event. Once an export has been committed, it should not be aborted to avoid breaking the high level STP message structure.

Figure 9:
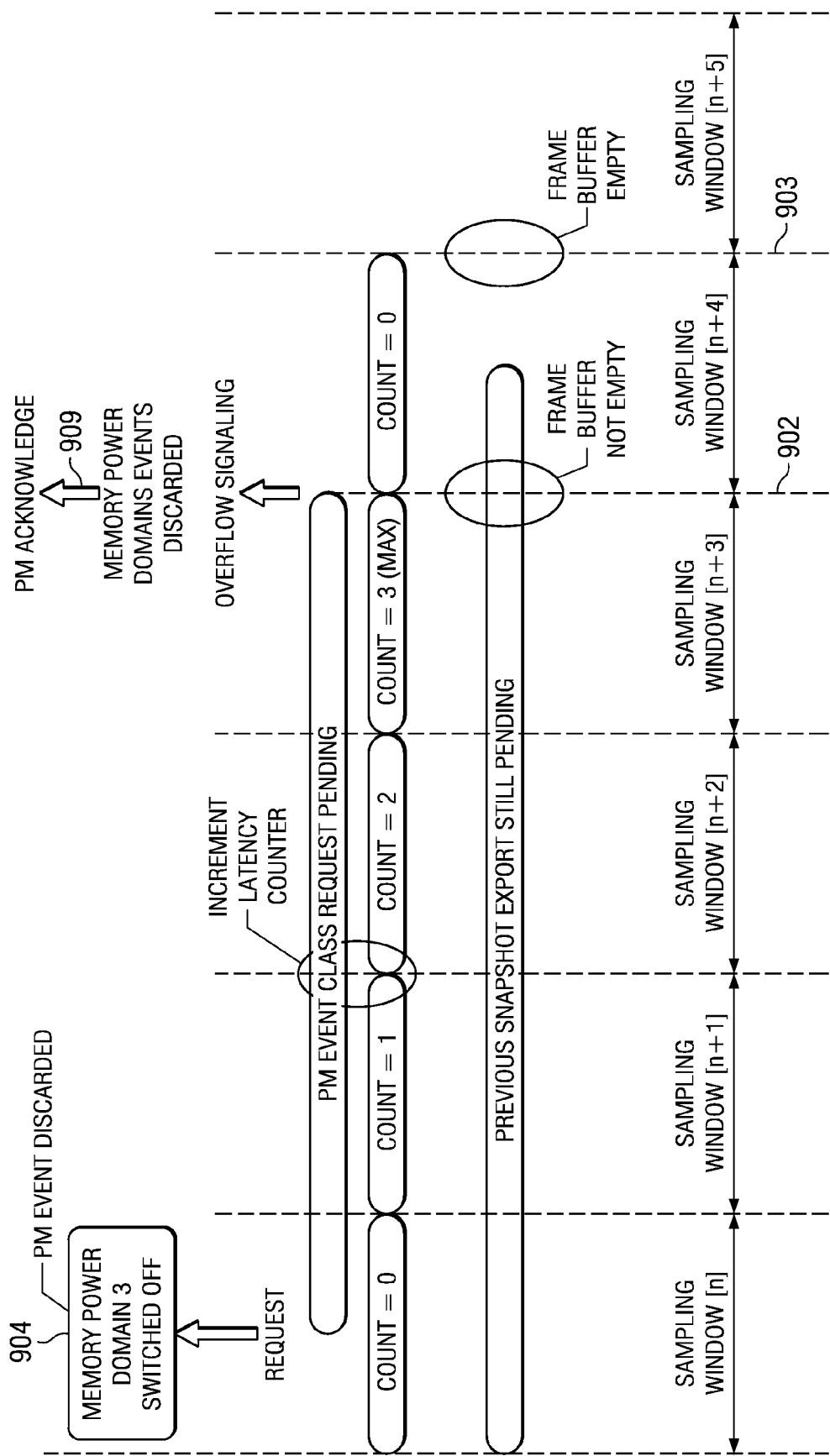

FIG. 9 illustrates PM events discarded due to export throughput. The PM instrumentation pipelining assumes that the snapshot corresponding to the PM events detected in sampling window [n−1] is initiated within the sampling window [n]. When this requirement cannot be met due to export throughput limitation, the PM instrumentation module allows the PM request 904 to be kept pending for a few sampling windows. Each event class gets a small counter resource, as described with regards to FIG. 8. For a case where the snapshot export cannot be initiated before the associated counter reaches its maximum value at time 902, the PM monitor signals an overflow and discards the pending PM event. The PM request is acknowledged as indicated at 909. The PM request processing can resume once the instrumentation frame buffer gets empty as indicated at time 903. The next snapshot export signals the overflow condition in a status indicator.

message. The time stamp requires only an extra byte injected by the STM. The time stamp (TS) value is set according to the number of pending messages present in the STM queue.

The Time Stamp offset being generated at STM level may not accurately reflect the PM event time stamp depending on PM scenario and the presence of concurrent instrumentation masters. The PM instrumentation STP message structure includes a STATUS field providing an indication on time stamp accuracy.

FIG. 11 illustrates the general format of an STP message 1100 with a time stamp. Dxx STP messages do not have a time stamp, while DxxTS STP messages included a time stamp. STP message 1100 includes a header 1102, a variable length data portion 1104, and an eight bit time stamp 1106. Table 3 illustrates the power monitoring hardware initiator high-level STP messages. A D8 eight bit event ID message, a D32 n×32 bit data message, and a D8TS eight bit status message with time stamp messages are illustrated. Other data sizes may also be accommodated.

TABLE 3

| High level STP message | | | | | | | |
|---|---|---|---|---|---|---|---|
| Byte 0 | | Byte 1 | | Byte 2 | | Byte 3 | |
| STP | 0 | 7 | 8 | 15 | 16 | 23 24 | 31 |
| D8 | EVT-ID | | | | | | |
| D32 | PM_evt1 | | PM_evt2 | | | PM_evt3 | |
| D8TS | TS ACC | E | Time Stamp | | | | |

FIG. 10 is a timing diagram illustrating triggering of event collection. For a particular debug scenario, the user may be only interested in monitoring PM events within a well defined window. The PM monitor may take advantage of the SOC cross-triggering infrastructure that is provided to perform instruction tracing to start or stop capturing PM events upon detecting a trigger input. When the PM monitor is configured to start collecting PM events upon external trigger detection, in the absence of trigger detection the PM requests that occur before the start trigger signal is assert are acknowledged but are not captured into the snapshot buffer. Upon detection of an external trigger 1002 routed to the TriggerStart_n input of instrumentation module 310 in FIG. 3, the PM requests 1004 occurring after the start trigger are acknowledged and captured into the snapshot buffer, as described above.

When the PM instrumentation module is configured to stop collecting PM events upon external trigger detection, in absence of trigger detection the PM requests 1004 are acknowledged and captured into the snapshot buffer. Upon detection of an external trigger 1006 routed to the TriggerStop_n input instrumentation module 310 in FIG. 3, the PM requests 1009 occurring after the stop trigger are acknowledged but are not captured into the snapshot buffer.

In case start and stop triggers are detected within the same cycle, the instrumentation module may consider the user-defined instrumentation window as nul. Therefore, for such use case no snapshot is reported to the user.

Time Stamping

The PM events are by nature slow events and do not require accurate time stamping. The time stamping is performed by the trace receiver and corrected by the STM queue offset encapsulated in DTS message. The STP protocol requires that every high level hardware message be marked by a time stamp to signal each high level message boundary. Therefore the last STP message in the sequence is a DTS (data time stamp)

Figure 12:
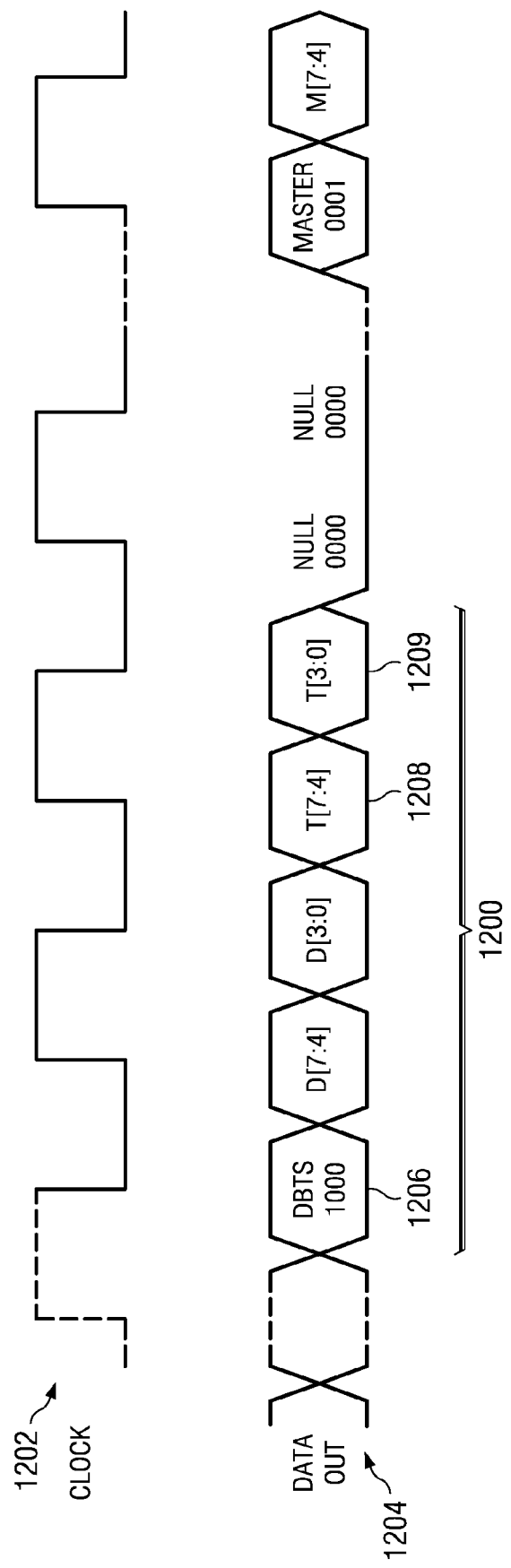
FIG. 12 is a timing diagram illustrating a data stream conforming to STP format which includes a time stamp.

FIG. 12 is a timing diagram illustrating a data stream 1204 conforming to STP format which includes a time stamp 1208-1209. The STP format transmits four bits on four-bit interconnect 110, referring to FIG. 1, during each phase of clock signal 1202. In this instance, a D8TS (eight-bit data and a time stamp) message identifier 1206 indicates an eight bit trace data value and a time stamp follows. The STM port is a 4-bit wide double data rate (DDR) interface operating around 100 MHz. The throughput is therefore 100 Mbytes/sec. The power management events are typically low activity events and should not consume a large amount of bandwidth. Depending on debug scenarios the user will be able to interleave other hardware or software instrumentation flows and correlate them. For example, a sequence of power state reports may be interleaved with a sequence of instruction execution traces.

The instrumentation flow interleaving across interconnect 110, referring to FIG. 1, is managed at Debug Subsystem level by STM 108. The PM instrumentation initiator port write burst sequence insures that the switch will always occur on burst boundary. Therefore the STP message write sequence will be preserved and never disrupted by other instrumentation flows.

Software and hardware initiators can be interleaved. By adding instrumentation code to the power management routines the user will be able evaluate latencies and understand any dependencies preventing the requested PM state change. PM state change request from software is traced by the Debug Subsystem instrumentation software initiator. Autonomous PM Hardware state change is traced by the PM instrumentation Debug Subsystem instrumentation hardware initiator. A Wake up event is traced by the System Events instrumentation Debug Subsystem instrumentation hardware initiator.

STP Messages

Table 4 summarizes the PM events groups and the assigned ID. Any state change in one group will trigger a full snapshot of the events group. Table 5 illustrates an example logic voltage domain operation change message. Table 6 illustrates an example memory voltage domain operation change message. Table 7 illustrates an example logic power domain state message. Table 8 illustrates an example memory power domain state message. Table 9 illustrates a clock domain message.

TABLE 4

PM events ID

| PM event ID | |
|---|---|
| 7:0 | PM event class |
| 0x00 | Logic Voltage Domain OPP change |
| 0x01 | Memory Voltage Domain OPP change |
| 0x02 | Logic power domain state change |
| 0x03 | Memory power domain state change |
| 0x04 | Reserved |
| ... | |
| 0xFF | |

TABLE 5

Logic voltage domain Operating Point (OPP) change message

| STP Header | Byte 0 | Byte 1 | Byte 2 | Byte 3 |
|---|---|---|---|---|
| D8 | PM event ID | | | |
| D32 | Voltage Domain 0 - Value sent through I2C | | Voltage Domain 1 - Value sent through voltage control interface (e.g. I2C) | |
| D32 | Voltage Domain 2 - Value sent through I2C | | Voltage Domain 3 - Value sent through voltage control interface | |
| D32 | Voltage Domain 4 - Value sent through I2C | | Voltage Domain 5 - Value sent through voltage control interface | |
| D32 | Voltage Domain 6 - Value sent through I2C | | OFF Mode | reserved |
| D8TS | STATUS | Time Stamp | | |

TABLE 6

Memory voltage domain OPP change

| STP Header | Byte 0 | Byte 1 | Byte 2 | Byte 3 |
|---|---|---|---|---|
| D8 | PM event ID | | | |
| D32 | FSM-0 STATE | FSM-1 STATE | FSM-2 STATE | FSM-3 STATE |
| D32 | FSM-4 STATE | FSM-5 STATE | FSM-6 STATE | FSM-7 STATE |
| D8TS | STATUS | Time Stamp | | |

TABLE 7

Logic Power Domain state message

| STP Header | Byte 0 | Byte 1 | Byte 2 | Byte 3 |
|---|---|---|---|---|
| D8 | PM event ID | | | |
| D32 | P0 P1 P2 P3 P4 P5 P6 P7 | | | |
| D32 | | | | |
| D32 | | | | |
| D32 | | | | Px |
| D8TS | STATUS | Time Stamp | | |

TABLE 8

Memory Power Domain state message

| STP Header | Byte 0 | Byte 1 | Byte 2 | Byte 3 |
|---|---|---|---|---|
| D8 | PM event ID | | | |
| D32 | P0 P1 P2 P3 P4 P5 P6 P7 | | | |
| D32 | | | | |
| D32 | | | | |
| D32 | | | | Px |
| D8TS | STATUS | Time Stamp | | |

TABLE 9

| STP Header | Byte 0 | | | | | | | Byte 1 | Byte 2 | Byte 3 |
|---|---|---|---|---|---|---|---|---|---|---|
| Clock domain message | | | | | | | | | | |
| D8 | CM event ID | | | | | | | | | |
| D32 | C0 | C1 | C2 | C3 | C4 | C5 | C6 | C7 | C8 to C15 | C16 to C23 | C24 to C31 |
| D32 | C32 | C33 | | | | | | | | |
| D32 | C64 | | | | | | | | | |
| D8TS | STATUS | | | | | | | Time stamp | | |

STATUS Field Definition

The Status field reports an error flag indicating that within the current sampling window more than one transition has been detected for the same event and provides to the user an indication of missing PM events. Multi-transitions are detected and signaled by the PM hardware. Concurrent events transitions on separate variables do not set the error flag. The error is associated to the PM events class and not to a specific PM event. Debugger software may decide to drop snapshots with error flag set. Depending on error rate, the debugger software may issue a warning requesting the user to re-visit sampling window width.

The status field also reports the amount of time required to export the current snapshot providing the trace receiver software a mean to improve the high level STP message Time Stamp accuracy. The export latency shall be expressed as sampling windows count. The snapshot export may be kept pending due to the interleaving of some other instrumentation flows. An export latency counter is associated to each PM event class. The export latency counter depth can be adjusted by configuring snapshot manager 312 on FIG. 3. When the export latency is above the counter range, the snapshot is discarded and PM acknowledged Component Ownership Some of PM instrumentation resources can be owned either by the application or by the debugger. The ownership is required to configure or program PM. In other words, ownership determines if write access is granted to the PM configuration registers. The PM instrumentation resource ownership is exclusive. Hence, simultaneous use of PM resources by both debugger and application is not permitted. However, the debugger can forcibly seize ownership of PM resources. Note that a read access does not require ownership; therefore, either party can read any PM instrumentation registers with or without ownership.

Figure 13:
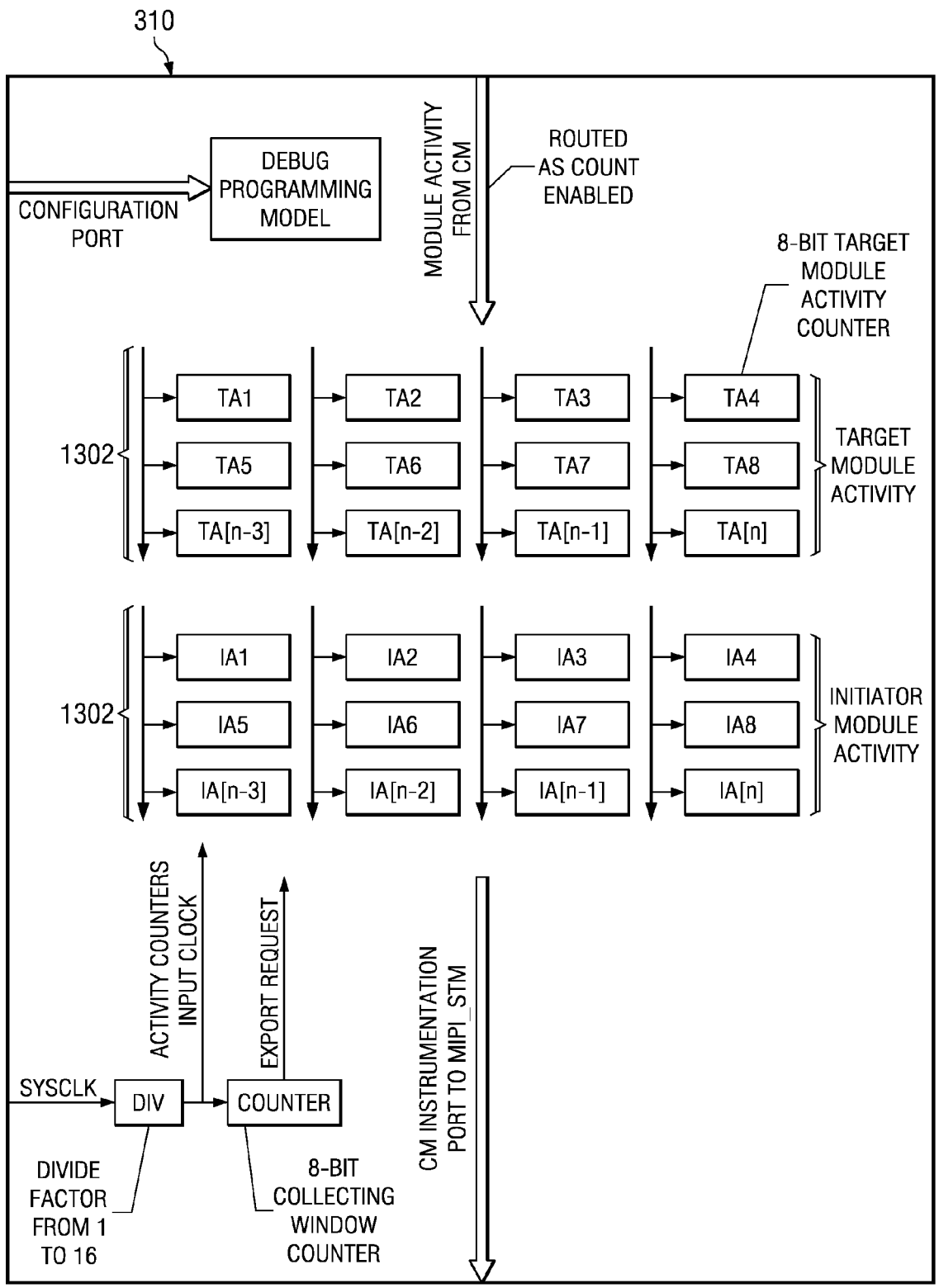
FIG. 13 is a block diagram illustrating activity counters.

FIG. 13 is a block diagram illustrating activity counters configured in instrumentation module 310 of FIG. 3. These activity counters are an embodiment of activity counters 244 illustrated in FIG. 2. When the user enables the module activity collection mode the instrumentation module frame buffer is configured as 2×set of 8-bit counters 1302 and 1304. Target activity counters 1302 collect target module activity while initiator counters 1304 collect initiator module activity. When the target or initiator module is inactive the corresponding counter is incremented. In another embodiment, the counters could be incremented when the target or initiator module is active. The inactive cycles are counted within a user-defined window. Periodically the counters frame is frozen and exported to the STM as an activity sample indicating for each module the active cycles/window cycles ratio. The trace receiver software computes activity ratio by dividing cycle count by sampling window size.

Figure 14:
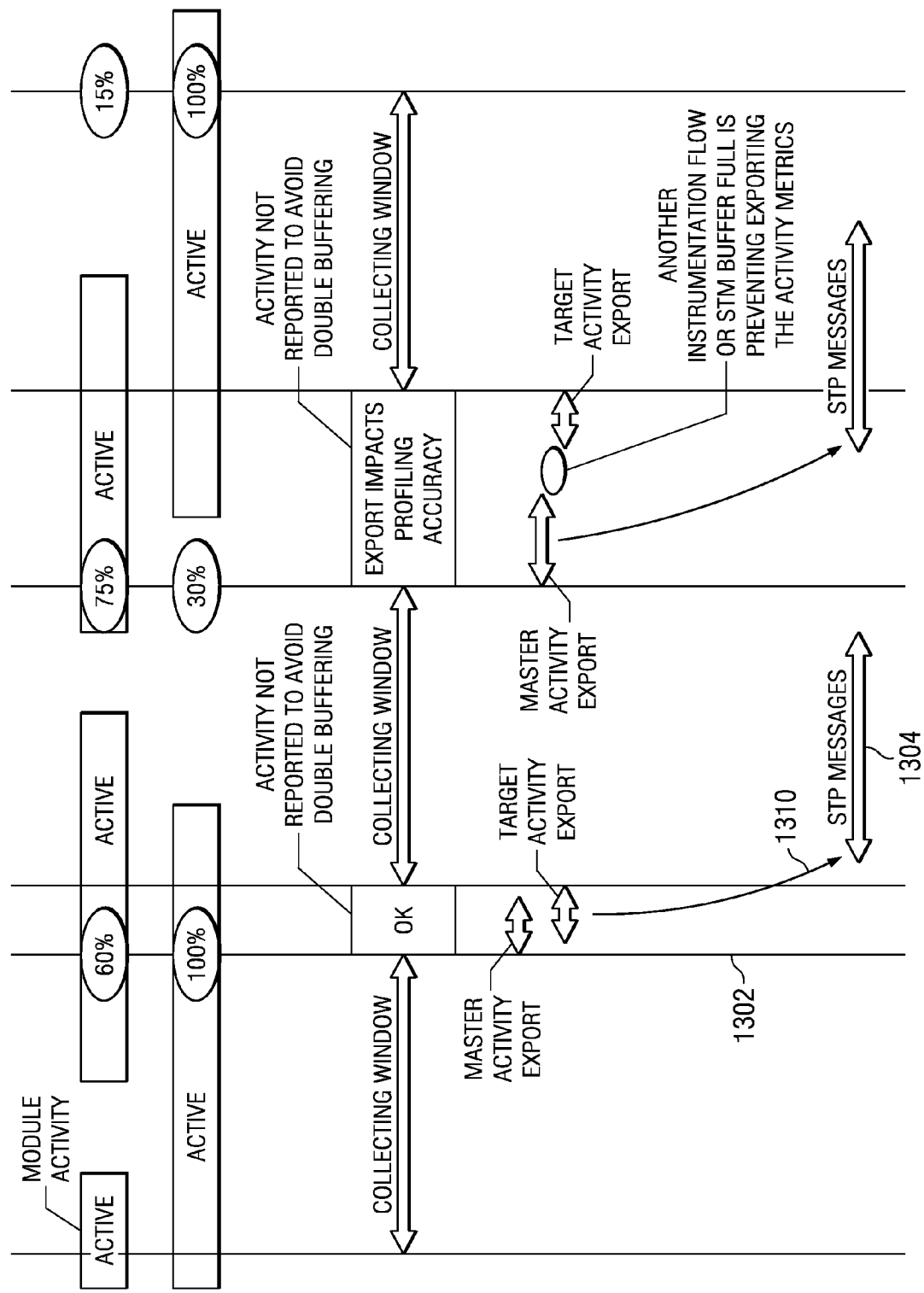
FIG. 14 is a timing diagram illustrating collection and transfer of activity reports.

FIG. 14 is a timing diagram illustrating collection and transfer of activity reports. For hardware cost optimization the Debug-IP doesn't implement double buffering. Therefore the activity counters frame is exported to STM to allow resetting the counters and collecting the next activity sample. For example, when the sample window counter expires at time 1302, an export counter is enabled and initiator and target activity counters are exported in STP messages 1304. At the completion of sending the STP messages at time 1310, the export counter value is captured into an STP message status field and the window timer is reset and started and the activity counters are reset and start collecting new activity counts. Activity is not reported during the export period in order to avoid having a double buffer. Of course, in another embodiment double buffering may be implemented.

Programming the collecting window size in the range of 100 to 200×FunClk cycles will make the transfer to STM pretty negligible versus module activity collection time and therefore should be compatible with the level of accuracy needed for power consumption modeling. However, depending on the application and debug scenario the metrics export may be stalled by another instrumentation flow or because the STM buffer is getting full. The user should be aware that the accuracy of the corresponding activity sample is not in the expecting range. Therefore the instrumentation module counts the export cycles and reports them through the high level STP message status field.

When interpreting the activity metrics log, by monitoring the status messages the user may assess the accuracy of the initiator/target activity metrics and if need re-visit the profiling setup by either increasing the collecting window or disabling concurrent instrumentation flows.

The debug programming model allows defining a collecting window size ranging from 1 to 256. The counter clock input runs at 1/n×FunClk frequency. The frame buffer counters are organized as 8-bit counter slots sampling the module activity at 1/n×FunClk frequency. The input clock divider 315 [ranging from 1 to 8] is shared by the activity counters and the collecting window counter 314. This will insure that for 100% activity the 8-bit counter will never overflow.

The debug programming model allows compressing the activity report by only encapsulating into the high level STP message the four least significant bits (LSB's) when the user performance monitoring strategy requires a module activity granularity >1/16 or a collecting window size <16×cycles. The STP message structure is optimized according to the user set up. A specific CM event ID differentiates 4-bit versus 8-bit averaged activity.

Switching CM Operating Modes

CM events capture and Module activity collections are two exclusive operating modes that require re-configuring the instrumentation module 310 register file. The user is not allowed to switch from one operating mode to another along the same CM instrumentation session. The PM instrumentation hardware insures the last CM snapshot has been exported to the STM and the PM instrumentation buffer has been fully drained before making the new operating mode effective.

Table 10 illustrates an initiator activity message when the collecting window has been programmed with a value >16 cycles, therefore 8-bit counter fields are encapsulated into the STP messages.

TABLE 10

Initiator activity message [8-bit]

| STP Header | Byte 0 | Byte 1 | Byte 2 | Byte 3 |
|---|---|---|---|---|
| D8 | CM event ID | | | |
| D32 | Initiator 0 Activity ratio | Initiator 1 Activity ratio | Initiator 2 Activity ratio | Initiator 3 Activity ratio |
| D32 | | | | |
| D32 | | | | Initiator n Activity ratio |
| D8TS | STATUS | Time stamp | | |

Table 11 illustrates an initiator message when the collecting window has been programmed with a value <16 cycles, therefore 4-bit counter fields are encapsulated into STP messages. In some embodiments the most significant bits of the activity counters may be monitored and four-bit compression selected automatically if the upper four bits are not changed.

TABLE 11

Initiator activity message [4-bit]

| STP Header | Byte 0 | | Byte 1 | | Byte 2 | | Byte 3 | |
|---|---|---|---|---|---|---|---|---|
| D8 | CM event ID | | | | | | | |
| D32 | Init 0 Activity ratio | Iinit 1 Activity ratio | Iinit 2 Activity ratio | Iinit 3 Activity ratio | Iinit 4 Activity ratio | Iinit 5 Activity ratio | Iinit 6 Activity ratio | Iinit 7 Activity ratio |
| D32 | | | | | | | | |
| D32 | | | | | | | | Iinit n Activity ratio |
| D8TS | STATUS | | Time stamp | | | | | |

Table 12 illustrates the CM profiling sample window register that controls snapshot manager 312.

TABLE 12

CM profiling sampling window register

| Field | Width | RW | Reset | Description |
|---|---|---|---|---|
| 31:20 | 12 | — | — | reserved |
| 19:16 | 4 | RW | 0 | FunClk divide factor ranging from 1 to 16 |
| 15:8 | 8 | — | — | reserved |
| 7:0 | 8 | RW | 0x00 | CM events capture CM events sampling window size Module activity collection Module activity collection window that triggers the counters export. Programming the MSB's field [4:7] with 0b0000 shall encapsulate only the 4 × activity counter LSB's into the 4-bit compact STP message structure. |

Figure 15:
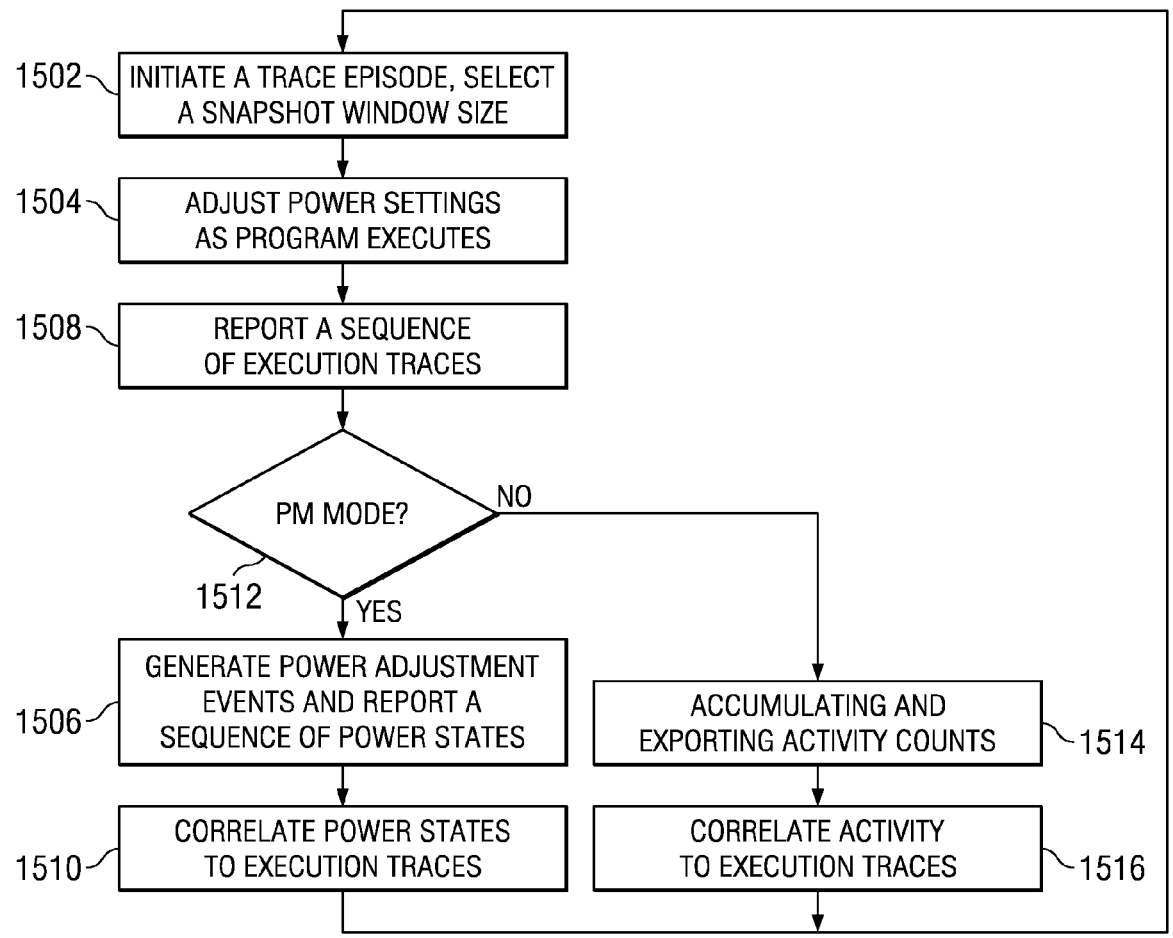
FIG. 15 is a flow chart illustrating operation of the power monitoring logic of FIG. 1.

FIG. 15 is a flow chart illustrating operation of the power monitoring logic of FIG. 1 on a system on a chip. The process is started by executing 1502 one or more software programs on the system on a chip (SOC). This may be a particular application that is being used to optimize hardware configuration settings for lower power operation of the SOC, or an application that is being optimized to reduce its power consumption. A window size is selected for reporting power monitoring events. As monitoring progress, the window size may be changed as needed to trade-off accuracy versus STM throughput.

As the program is executed, power control settings of a plurality of functional units within the SOC are adjusted 1504 in response to executing the one or more software programs. As discussed earlier, these adjustments may occur due to explicit direction by the application program or may be done by autonomous actions performed by hardware that monitors loading or activity of various functional modules. Because of these actions, power consumption within the SOC varies over time.

While in a power monitoring mode 1512, when power events occur, they are reported 1506 as a sequence of power states for the plurality of functional units within the SOC. As described earlier, each time an adjustment is made to the voltage, power or clock domain controls, a new power state is formed. A power state may include clock frequency, voltage level, power domain state, initiator activity, target activity, memory module power enablement, or power enablement of each of the plurality of functional units, for example. In order to facilitate correlation to program execution activity, a time stamp is attached to each exported power state. The power adjustment events are classified and an identification value is included with each power state export message. An error is reported if one class of events occurs more than once in a reporting window represented by one time stamp. If needed, the snapshot window size may be reduced in order to eliminate multiple event errors. Occasionally, an event class may be split across more than one report message. PM instrumentation may also provide a filtering capability to focus on a class of problem and reduce export throughput or increase accuracy. The trace interpretation take into account PM states and CM activity for initiators and targets.

During execution of the application program, traces are made of the program execution using known techniques. These traces are then reported 1508 as a sequence of execution traces responsive to executing the one or more software programs.

Once the power states and execution traces are exported to an external monitoring system, they may be correlated 1510 using the time stamps to allow evaluation of the efficiency of the autonomous power control modules and/or to identify areas within the program that may be modified to reduce power consumption. Since power management scenarios may be complex, the visibility of the operation of the voltage, power and clock control modules allows finding ways to improve or to simplify the power management scenarios. Configuration settings of the autonomous voltage or clock controllers may be improved, or a particular portion of the application program may be revised to reduce power consumption. An unexpected dependency may be highlighted that is preventing a power domain from shutting down, for example.

The mode of reporting may be selected 1512 to be either power monitoring or activity monitoring of initiator activity and target activity. In activity monitoring mode, activity counts are accumulated 1514 for one or more of the functional units. The activity counts may be compressed by determining if the most significant bits (msbs) of the sampling window are configured to be zero. Since he activity cycle count cannot be larger than the sampling window, the corresponding msbs of the activity count may be truncated since by definition they will also be zero. A report message is then transmitted using a smallest message format that will encapsulate the compressed activity count. If compression is not needed, then fixed length messages may always be exported.

Once the activity counts are exported, the activity of the functional units may be correlated 1516 to the execution traces using the time stamps to allow evaluation of the efficiency of the autonomous power control modules and/or to identify areas within the program that may be modified to reduce power consumption.

System Application

Figure 16:
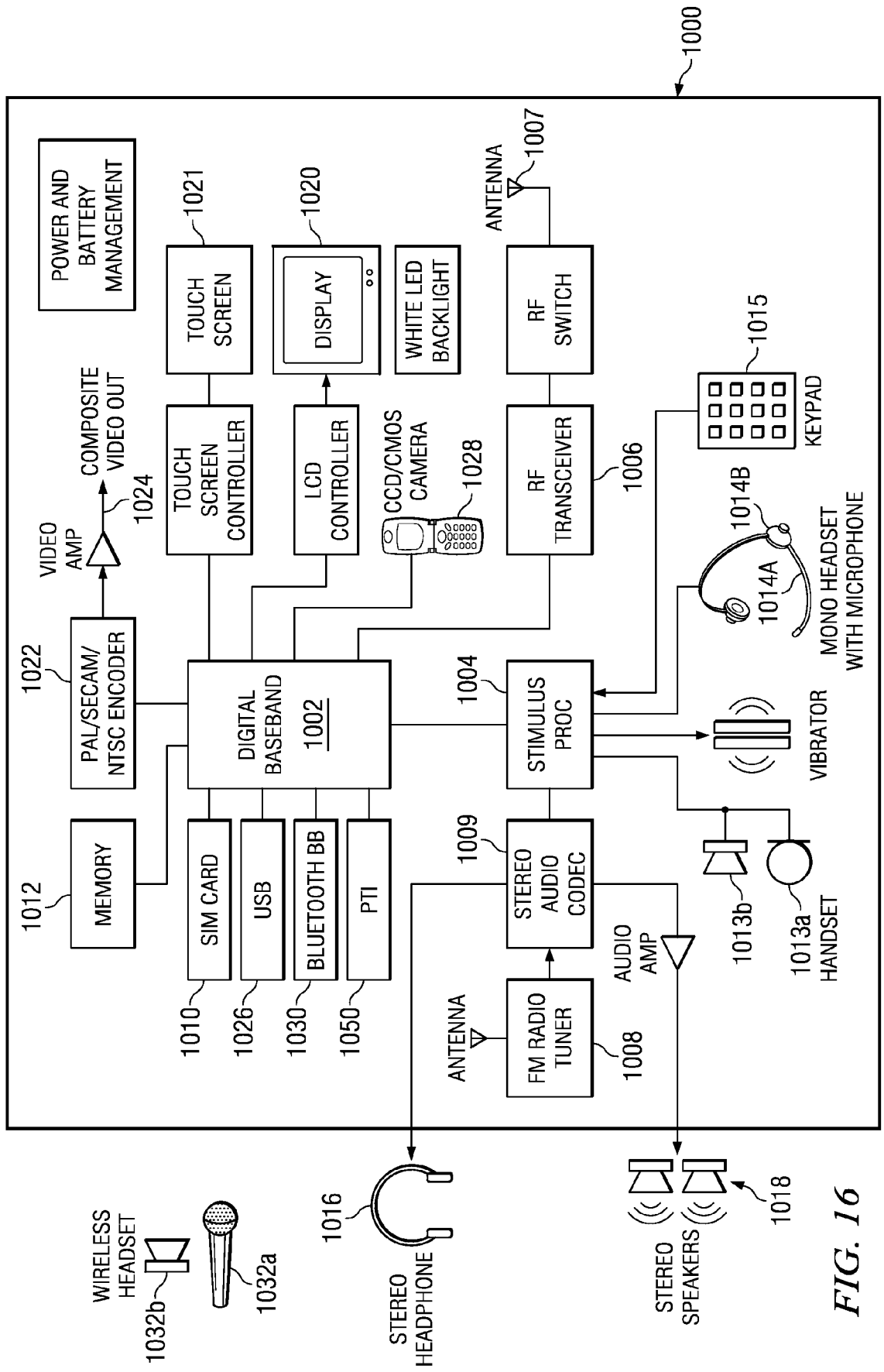
FIG. 16 is a block diagram illustrating a system that includes an ASIC with an embodiment of an STM that includes a power monitoring module.

FIG. 16 is a block diagram of mobile cellular phone 1000 for use in a cellular network. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unit 1000.

The basic DSP radio can include discrete Fourier transform (DFT), resource (i.e. tone) mapping, and IFFT (fast implementation of IDFT) to form a data stream for transmission. To receive the data stream from the received signal, the radio can include DFT, resource de-mapping and IFFT. The operations of DFT, IFFT and resource mapping/de-mapping may be performed by instructions stored in memory 1012 and executed by DBB 1002 in response to signals received by transceiver 1006.

DBB 1002 contains power management instrumentation module (PMI) that performs power and activity monitoring as described above with respect to FIGS. 1-15. The PMI is coupled to the DSP and various peripherals internal to DBB 1002 and is operable to collect trace events and power events to aid in debugging the various DSP radio tasks described above. A sequence of trace events, power events and time stamps can be transmitted to an external trace receiver when one is coupled to PTI connector 1050. When an external trace receiver is not coupled to PTI connector 1050, then the stream of trace events and time stamps formed may be stored in the embedded trace buffer. From there, the stream of trace events and time stamps may be transferred to an external analysis device via USB port 1026 or Bluetooth port 1030, for example.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

Other Embodiments

As used herein, the terms "applied," "coupled," "connected," and "connection" mean electrically connected, including where additional elements may be in the electrical connection path. "Associated" means a controlling relationship, such as a memory resource that is controlled by an associated port.

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

While the invention has been described with reference to illustrative embodiments, this description is not intended to be construed in a limiting sense. Various other embodiments of the invention will be apparent to persons skilled in the art upon reference to this description. For example, another embodiment may use another test and debug interface that is not related to MIPI. In various embodiments, narrow or wide versions of P1149.7 may be used. Other embodiments may use interconnects that are not P1149.7 based.

In some embodiments, the ASIC may be mounted on a printed circuit board. In other embodiments, the ASIC may be mounted directly to a substrate that carries other integrated circuits. Various sizes and styles of connectors may be used for connection to an external trace receiver.

The embodiment described herein included clock sources generated using one or more phase locked loops that may be configured to produce different frequencies. In another embodiment, a fixed oscillator or time base may be used. Various combinations of frequency dividers or pulse gating may be used to vary the effective clock frequency to various clock domains.

While a cellular handset embodying the invention was described herein, this system description is not intended to be construed in a limiting sense. Various other system embodiments of the invention will be apparent to persons skilled in the art upon reference to this description. For example, an ASIC embodying the invention may be used in many sorts of mobile devices such as a personal digital assistants (PDA), audio/video reproduction devices, global positioning systems, radios, televisions, personal computers, etc, or any device where minimization of power dissipation is important. Other embodiments may be used in fixed or typically non-mobile devices, such as computers, televisions or any device where minimization of power dissipation is important.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

It is therefore contemplated that the appended claims will cover any such modifications of the embodiments as fall within the true scope and spirit of the invention.

What is claimed is:

1. A method for monitoring a system on a chip, comprising:
   executing one or more software programs on the system on a chip (SOC);
   adjusting power control settings of a plurality of functional units within the SOC in response to executing the one or more software programs, whereby power consumption within the SOC varies over time; and
   reporting a sequence of power states for the plurality of functional units within the SOC, wherein each adjustment of the power control settings is a new power state;
   wherein adjusting power control settings comprises: determining a present work load for one of the plurality of functional units; and adjusting a power control setting of the one functional unit in accordance with the present work load of the one functional unit.

2. The method of claim 1, wherein a power state comprises clock frequency, voltage level, initiator activity, target activity, memory module power enablement, or power enablement of one or more of the plurality of functional units.

3. The method of claim 1, further comprising:
   reporting a sequence of execution traces responsive to executing the one or more software programs; and
   correlating the sequence of power states to the sequence of execution traces.

4. A method for monitoring a system on a chip, comprising:
   executing one or more software programs on the system on a chip (SOC);
   adjusting power control settings of a plurality of functional units within the SOC in response to executing the one or more software programs, whereby power consumption within the SOC varies over time;
   reporting a sequence of power states for the plurality of functional units within the SOC, wherein each adjustment of the power control settings is a new power state;
   reporting a sequence of execution traces responsive to executing the one or more software programs;
   correlating the sequence of power states to the sequence of execution traces;
   identifying a particular portion of the one or more software programs that result in higher power dissipation in the SOC by examining the correlated sequence of power states; and
   revising the particular portion of the one or more software programs to reduce power consumption on the SOC.

5. The method of claim 4, further comprising identifying a particular adjustment of the power control settings that is performed automatically under hardware control by examining the correlated sequence of power states and modifying the setup of the hardware control to thereby change the particular adjustment.

6. A method for monitoring a system on a chip, comprising:
   executing one or more software programs on the system on a chip (SOC);
   adjusting power control settings of a plurality of functional units within the SOC in response to executing the one or more software programs whereby power consumption within the SOC varies over time;
   reporting a sequence of power states for the plurality of functional units within the SOC, wherein each adjustment of the power control settings is a new power state;
   reporting a sequence of execution traces responsive to executing the one or more software programs; and
   correlating the sequence of power states to the sequence of execution traces;
   wherein reporting the sequence of power states attaches a time stamp to each power state report, and reporting the sequence of execution traces attaches a time stamp to each execution trace.

7. The method of claim 6, wherein reporting the sequence of power states further comprises attaching a flag when a power control setting for a particular one of the plurality of functional units is adjusted more than once in a power state window represented by one time stamp.

8. The method of claim 3, wherein the sequence of power states and the sequence of execution traces are reported using a common interface port connected to the SOC.

9. A method for monitoring a system on a chip, comprising:
   executing one or more software programs on the system on a chip (SOC);
   adjusting power control settings of a plurality of functional units within the SOC in response to executing the one or more software programs, whereby power consumption within the SOC varies over time; and
   reporting a sequence of power states for the plurality of functional units within the SOC, wherein each adjustment of the power control settings is a new power state;
   wherein reporting a sequence of power states comprises: generating a classified event request in response to an adjustment of the power control settings: and transmitting a report message indicative of the event class.

10. The method of claim 9, wherein reporting a sequence of power states comprises:
    configuring a sampling window size;
    reporting a respective one of the sequence of power states at the end of a respective sampling window; and
    reporting additional latency when a power state report is delayed for more than one sampling window.

11. The method of claim 9, further comprising filtering a particular class of power adjustments such that a sequence of power states corresponding to the filtered class of power adjustments is reported.

12. The method of claim 1, wherein the power control settings comprise clock settings for one or more of the plurality of functional units.

13. The method of claim 12, further comprising selecting a mode of reporting; and
wherein reporting the sequence of power states comprises reporting a sequence of clock setting states for the plurality of functional units for the selected mode of reporting, and wherein each adjustment of the clock control settings is a new clock setting state.

14. The method of claim 13, wherein the mode of reporting is selected to provide initiator activity and target activity.

15. The method of claim 14, wherein reporting a sequence of power states comprises:
configuring a sampling window count value;
accumulating activity counts for one or more of the functional units while counting the window count value;
compressing a selected activity count by truncating a portion of the most significant bits of the activity count when a corresponding portion of most significant bits of the configured window count value are all zero; and
transmitting a report message using a smallest message format that will encapsulate the compressed activity count.

16. A digital system, comprising:
a plurality of functional units interconnected together and configured to execute one or more software programs;
power control circuitry coupled to the plurality of functional units, wherein the power control circuitry is adjustable to individually control power consumption of the plurality of functional units;
power monitoring circuitry coupled to the power control circuitry, the power monitoring circuitry configured to report a sequence of power states for the plurality of functional units, wherein each adjustment of the power control settings is a new power state;
execution trace circuitry coupled to one or more of the plurality of functional units, the execution trace circuitry configured to report a sequence of execution traces responsive to executing the one or more software programs, and
an interface port coupled to the power monitoring circuit and to the execution trace circuitry configured to provide the sequence of power states and execution traces to another system;
wherein the power control circuitry is configured to determine a present work load for at least one of the plurality of functional units and to automatically adjust a power control setting of the at least one functional unit in accordance with the present work load of the at least one functional unit.

17. A digital system, comprising:
a plurality of functional units interconnected together and configured to execute one or more software programs;
power control circuitry coupled to the plurality of functional units wherein the power control circuitry is adjustable to individually control power consumption of the plurality of functional units;
power monitoring circuitry coupled to the power control circuitry, the power monitoring circuitry configured to report a sequence of power states for the plurality of functional units, wherein each adjustment of the power control settings is a new power state;
execution trace circuitry coupled to one or more of the plurality of functional units, the execution trace circuitry configured to report a sequence of execution traces responsive to executing the one or more software programs, and
an interface port coupled to the power monitoring circuit and to the execution trace circuitry configured to provide the sequence of power states and execution traces to another system;
wherein the power monitoring circuitry is configured to attach a time stamp to each reported power state; and wherein the execution trace circuitry is configured to attach a time stamp to each reported execution trace.

18. The digital system of claim 17, wherein the power monitoring circuitry is configured to attach a flag to indicate when a power control setting for a particular one of the plurality of functional units is adjusted more than once in a power state window represented by one time stamp.

19. A digital system, comprising:
a plurality of functional units interconnected together and configured to execute one or more software programs;
power control circuit coupled to the plurality of functional units wherein the power control circuitry is adjustable to individually control power consumption of the plurality of functional units;
power monitoring circuitry coupled to the power control circuitry, the power monitoring circuitry configured to report a sequence of power states for the plurality of functional units, wherein each adjustment of the power control settings is a new power state;
execution trace circuitry coupled to one or more of the plurality of functional units, the execution trace circuitry configured to report a sequence of execution traces responsive to executing the one or more software programs, and
an interface port coupled to the power monitoring circuit and to the execution trace circuitry configured to provide the sequence of power states and execution traces to another system;
wherein the power monitoring circuitry is configured to classify types of adjustments to the power control circuitry, and wherein the power monitoring circuitry comprises a configurable filter configured to filter a selected class of power adjustments such that a sequence of power states corresponding to the filtered class of power adjustments is reported.

20. The digital system of claim 16, further comprising:
clock control circuitry coupled one or more of the plurality of functional units, wherein the clock control circuitry is adjustable to individually control clock frequency of the one or more functional units; and
clock monitoring circuitry coupled to the clock control circuitry, the clock monitoring circuitry configured to report a sequence of clock control states for the one or more functional units, wherein each adjustment of the clock control settings is a new clock setting state, and wherein the clock monitoring circuitry is configured to attach a time stamp to each clock setting state report.

* * * * *